US012504530B1

(12) United States Patent
Chang et al.

(10) Patent No.: US 12,504,530 B1
(45) Date of Patent: Dec. 23, 2025

(54) CALIBRATING A SINGLE LENS CAMERA AND A RADAR FOR FUSING OBJECTS DETECTED BY RADAR WITH OBJECTS CAPTURED BY THE SINGLE LENS CAMERA

(71) Applicant: Ambarella International LP, Santa Clara, CA (US)

(72) Inventors: Chih-Hao Chang, Taichung (TW); Tze-Ching Chuang, Taipei (TW); Hsin-Hao Chang, Zhubei (TW)

(73) Assignee: Ambarella International LP, Santa Clara, CA (US)

( * ) Notice: Subject to any disclaimer, the term of this patent is extended or adjusted under 35 U.S.C. 154(b) by 299 days.

(21) Appl. No.: 18/232,623

(22) Filed: Aug. 10, 2023

(51) Int. Cl.
*G01S 13/86* (2006.01)
*G01S 7/295* (2006.01)
*G01S 7/40* (2006.01)
*G01S 13/42* (2006.01)
*G06T 7/80* (2017.01)

(52) U.S. Cl.
CPC .......... *G01S 13/867* (2013.01); *G01S 7/2955* (2013.01); *G01S 7/40* (2013.01); *G01S 13/426* (2013.01); *G06T 7/80* (2017.01)

(58) Field of Classification Search
None
See application file for complete search history.

(56) References Cited

U.S. PATENT DOCUMENTS

| | | | | |
|---|---|---|---|---|
| 7,423,673 | B1 * | 9/2008 | Efrat | G06T 7/80 348/222.1 |
| 11,557,061 | B2 * | 1/2023 | Cadien | G01S 13/867 |
| 2006/0227041 | A1 * | 10/2006 | Okamoto | G01S 13/867 342/55 |
| 2010/0253489 | A1 * | 10/2010 | Cui | G01S 13/867 340/425.5 |
| 2016/0116573 | A1 * | 4/2016 | Appia | G01S 13/867 342/52 |
| 2017/0085771 | A1 * | 3/2017 | Schwager | G01S 13/867 |
| 2018/0174327 | A1 * | 6/2018 | Singh | G06T 7/80 |
| 2019/0120934 | A1 * | 4/2019 | Slutsky | G06T 7/80 |
| 2019/0120955 | A1 * | 4/2019 | Zhong | G01S 13/867 |

(Continued)

FOREIGN PATENT DOCUMENTS

CN 111538008 A * 8/2020 ............ G01S 13/931

*Primary Examiner* — Bernarr E Gregory
(74) *Attorney, Agent, or Firm* — Maiorana Patent Law, PA

(57) ABSTRACT

An apparatus comprising an interface and a processor. The interface may receive pixel data and radar data. The processor may process the pixel data arranged as video frames, calculate an intrinsic matrix for an image sensor, generate image mapping points to an environment, generate an image transformation matrix in response to the mapping points, the intrinsic matrix and depth data, define a valid area in response to the radar data of an object, generate radar mapping points in response to an environment, generate a mapping function in response to the radar mapping points and a transfer operation, and implement a coordinate transformation in response to the image transformation matrix and the mapping function. The coordinate transformation may be configured to transfer radar coordinates to image coordinates in response to the mapping function and transfer the image coordinates to environment coordinates using the image transformation matrix.

20 Claims, 17 Drawing Sheets

(56) References Cited

U.S. PATENT DOCUMENTS

| | | | | |
|---|---|---|---|---|
| 2019/0391254 A1* | 12/2019 | Asghar | ................. | G01S 13/867 |
| 2020/0018848 A1* | 1/2020 | Rivers | ................... | G01S 13/867 |
| 2020/0034988 A1* | 1/2020 | Zhou | ........................ | G06T 7/80 |
| 2020/0174112 A1* | 6/2020 | Xing | ..................... | G01S 13/867 |

\* cited by examiner

CALIBRATING A SINGLE LENS CAMERA AND A RADAR FOR FUSING OBJECTS DETECTED BY RADAR WITH OBJECTS CAPTURED BY THE SINGLE LENS CAMERA

FIELD OF THE INVENTION

The invention relates to sensor data generally and, more particularly, to a method and/or apparatus for implementing calibrating a single lens camera and a radar for fusing objects detected by radar with objects captured by the single lens camera.

BACKGROUND

Devices are increasingly being equipped with various types of sensors. Each sensor is capable of generating data. Each data type generated by a sensor when interpreted alone provides a limited amount of information. Sensor fusion combines disparate sources of data to provide insight that would not be available from one data type alone. Each data type generated by a particular type of sensor (i.e., image data, radar data, temperature data, audio data, etc.) can complement other data types and address shortcomings of the various data types.

Fusing radar data with image data is one type of sensor fusion. Radar data can provide a high resolution of three dimensional positional information in various visibility conditions but does not provide visual details. Image data can provide high resolution visual detail but is limited in low visibility environments and provides two dimensional data. Fusing radar data with image data provides a rich data source.

Radar data and image data each provide large amounts of data that results in a large amount of data processing. Many use-cases for fusing radar data and image data are real-time applications, which require the high volume of data to be processed quickly. In order for radar data and image data to be useful together, both types of data need to be analyzed on a common basis (i.e., correlated to the real-world environment). Physical variations (i.e., individual lens distortions, device characteristics, operating specification, operating tolerances, etc.) adds an additional layer of difficulty in fusing the data because each sensor can behave differently even in the same product line.

It would be desirable to implement calibrating a single lens camera and a radar for fusing objects detected by radar with objects captured by the single lens camera.

SUMMARY

The invention concerns an apparatus comprising an interface and a processor. The interface may be configured to receive pixel data and radar data. The processor may be configured to process the pixel data arranged as video frames, calculate an intrinsic matrix for an image sensor using a calibration method, generate a plurality of image mapping points to an environment for the image sensor using an image correction method, generate an image transformation matrix in response to the mapping points, the intrinsic matrix and depth data, define a valid area in response to the radar data of an object, generate a plurality of radar mapping points in response to an environment for a radar device using a radar correction method, generate a mapping function in response to the plurality of radar mapping points and a transfer operation, and implement a coordinate transformation in response to the image transformation matrix and the mapping function. The intrinsic matrix may comprise distortion coefficients for a single camera lens. The radar mapping points may bind radar coordinates to image coordinates. The depth data may be generated in response to the radar coordinates. The coordinate transformation may be configured to transfer radar coordinates to image coordinates in response to the mapping function and transfer the image coordinates to environment coordinates using the image transformation matrix.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
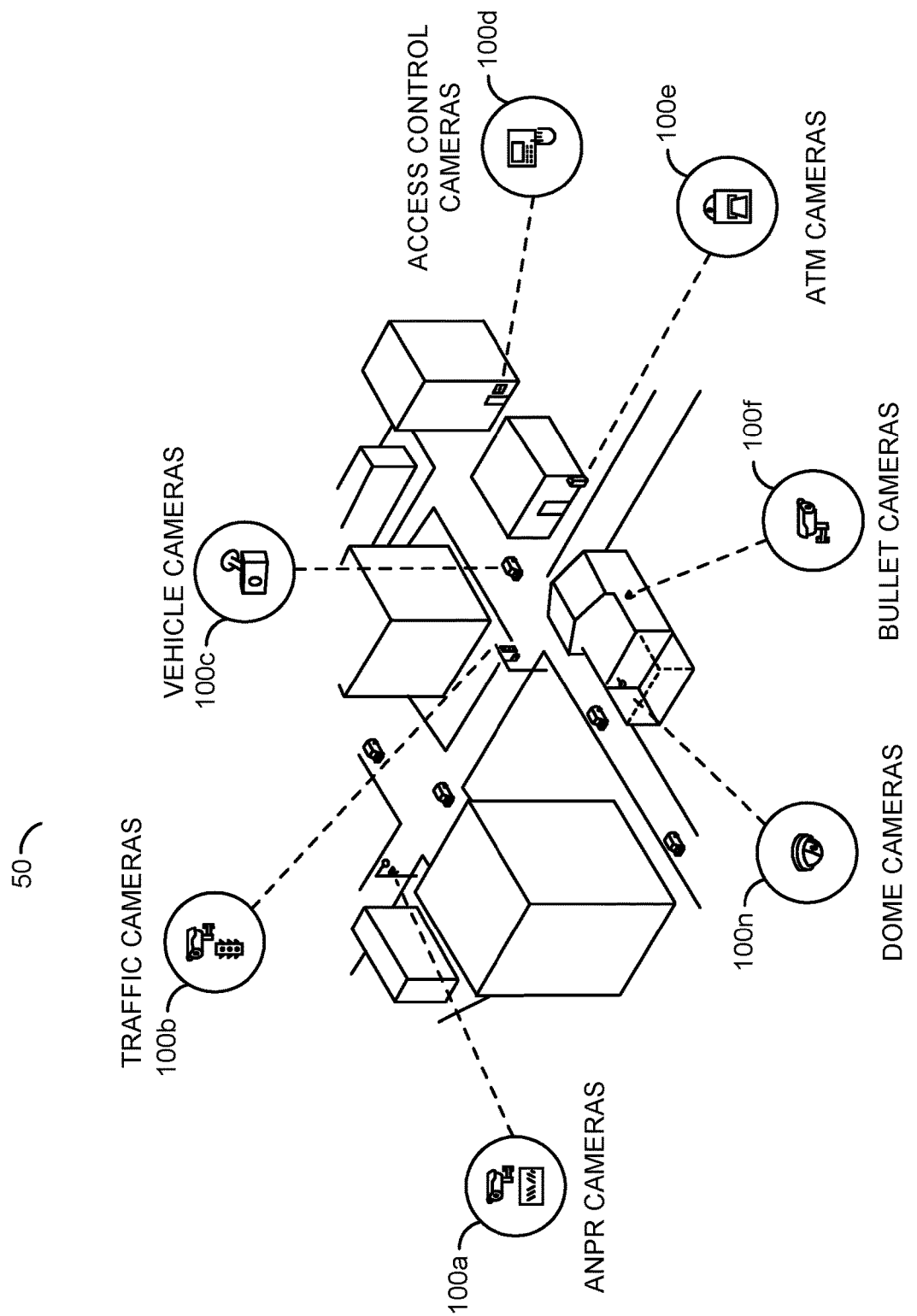
FIG. 1 is a diagram illustrating examples of edge devices that may utilize a processor configured to implement calibrating a single lens camera and a radar for fusing objects detected by radar with objects captured by the single lens camera.

Embodiments of the present invention include providing calibrating a single lens camera and a radar for fusing objects detected by radar with objects captured by the single lens camera that may (i) be implemented on an edge device comprising both an image sensor and a radar module, (ii) be implemented for an image sensor on a separate device from a radar module, (iii) align a region of interest from radar to a region of interest from an image, (iv) correct image distortion for a single camera lens, (v) transform an image coordinate to an environment coordinate, (vi) transform a radar coordinate to an image coordinate, (vii) use depth data from a radar to transfer image coordinates to environment coordinates, (viii) generate mapping points for image data and radar data and/or (ix) be implemented as one or more integrated circuits.

Embodiments of the present invention may be configured to calibrate a camera and a radar device to enable sensor fusion of image data and radar data. In an example, the camera may comprise a single lens camera. In an example, the radar device may be a mmWave radar. For example, the mmWave radar may be a non automotive radar. The field of view (FoV) of the radar may be fused with the FoV used for computer vision.

Fusing the FoV of the radar with the FoV used for computer vision may enable a region of interest (ROI) of the image to be determined based on a presence of objects detected by the radar. The radar data may provide additional information that may add context to the image data. In one example, using an aligned ROI determined using the radar data, processing of the image may be limited to the ROI of the image (e.g., where both the ROI of the radar data and the ROI of the image data intersect). Performing image processing on the ROI rather than a full video frame may reduce an amount of processing performed on the image. In another example, bitrate control may be based on the aligned ROI. In yet another example, exposure adjustments may be determined based on the aligned ROI. In still another example, image processing enhancements (e.g., using a neural network for image signal processing) and/or other video/image quality control features may be performed based on the aligned ROI. The various types of processing performed using the aligned ROI may be varied according to the design criteria of a particular implementation.

Embodiments of the present invention may be configured to prepare the edge device(s) (e.g., an image sensor and/or a radar module) for generating an aligned ROI at runtime. Calibration and/or correction techniques may be performed on the image sensor and/or the radar module. The calibration and/or correction techniques may be implemented to reduce as many errors as possible that may be intrinsic to the particular device (e.g., correct errors that may be unique to the device). The calibration and/or correction techniques may be implemented to reduce as many errors as possible in various aspects of fusing the image data with the radar data.

Embodiments of the present invention may be configured to implement camera correction techniques. In one example, a lens distortion correction may be implemented to accommodate lens distortion errors caused by the camera lens implemented by the edge device and/or determine an optical center for the camera. Implementing lens distortion correction may reduce an impact of lens distortion errors on subsequent calculations. An intrinsic matrix may be generated to correct lens distortion and/or determine the optical center. Calibration of data points may be performed. The calibration of data points may enable the generation of an extrinsic matrix (e.g., an image transformation matrix). The extrinsic matrix may be used to implement a coordinate transformation (e.g., for transforming two dimensional image coordinates to three dimensional real world coordinates of the environment). The camera calibration and/or correction may be implemented using a combination of image processing and/or manual placement of physical objects to enable the edge device to capture various test images (e.g., dot patterns, checkerboard patterns, visual charts, etc.).

Embodiments of the present invention may be configured to implement radar correction techniques. In one example, valid data may be defined and invalid data may be filtered. For example, the invalid data may be filtered based on a signal-to-noise ratio (SNR) value, a strength value, a filter static point, a range of data (e.g., larger than the FoV of the camera lens), etc. Further correction techniques may be implemented to create a mapping function. Data points may be generated for radar mapping. Based on the radar mapping, a transfer function may be generated. The transfer function may enable the radar coordinates to be transferred to image coordinates. In an example, the image may be divided (e.g., partitioned) into several blocks based on the angles of the radar device for mapping the radar data to the image data. The radar calibration and/or correction may be implemented using a combination of image processing, radar data processing and/or manual placement of a corner reflector.

The correction and/or calibration of the camera and/or the radar module may be performed to enable the creation of a mapping method. The correction and/or calibration may be performed while the edge device is offline and/or during manufacturing. The correction and/or calibration may enable generating a coordinate transformation in response to an image transformation matrix and a mapping function. The coordinate transformation may be configured to transfer radar coordinates to image coordinates in response to the mapping function and transfer the image coordinates to environment coordinates using the image transformation matrix.

Referring to FIG. 1, a diagram illustrating examples of edge devices that may utilize a processor configured to implement calibrating a single lens camera and a radar for fusing objects detected by radar with objects captured by the single lens camera is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems) and/or radar modules. The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. The radar module implemented by the edge devices 100a-100n may be configured to detect a proximity and/or location of objects/obstacles around the particular edge device. In an example, the radar module may comprise an antenna array that generate raw radar data with sparsity (e.g., low volume data from a relatively low number of antennas). The sparse antenna array may enable a high resolution of data to be acquired with a low module cost.

In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, raw radar data may be generated at a low volume, which may be converted to a high resolution of data. The design, type and/or application performed by the edge devices 100a-100n may be varied according to the design criteria of a particular implementation.

Figure 2:
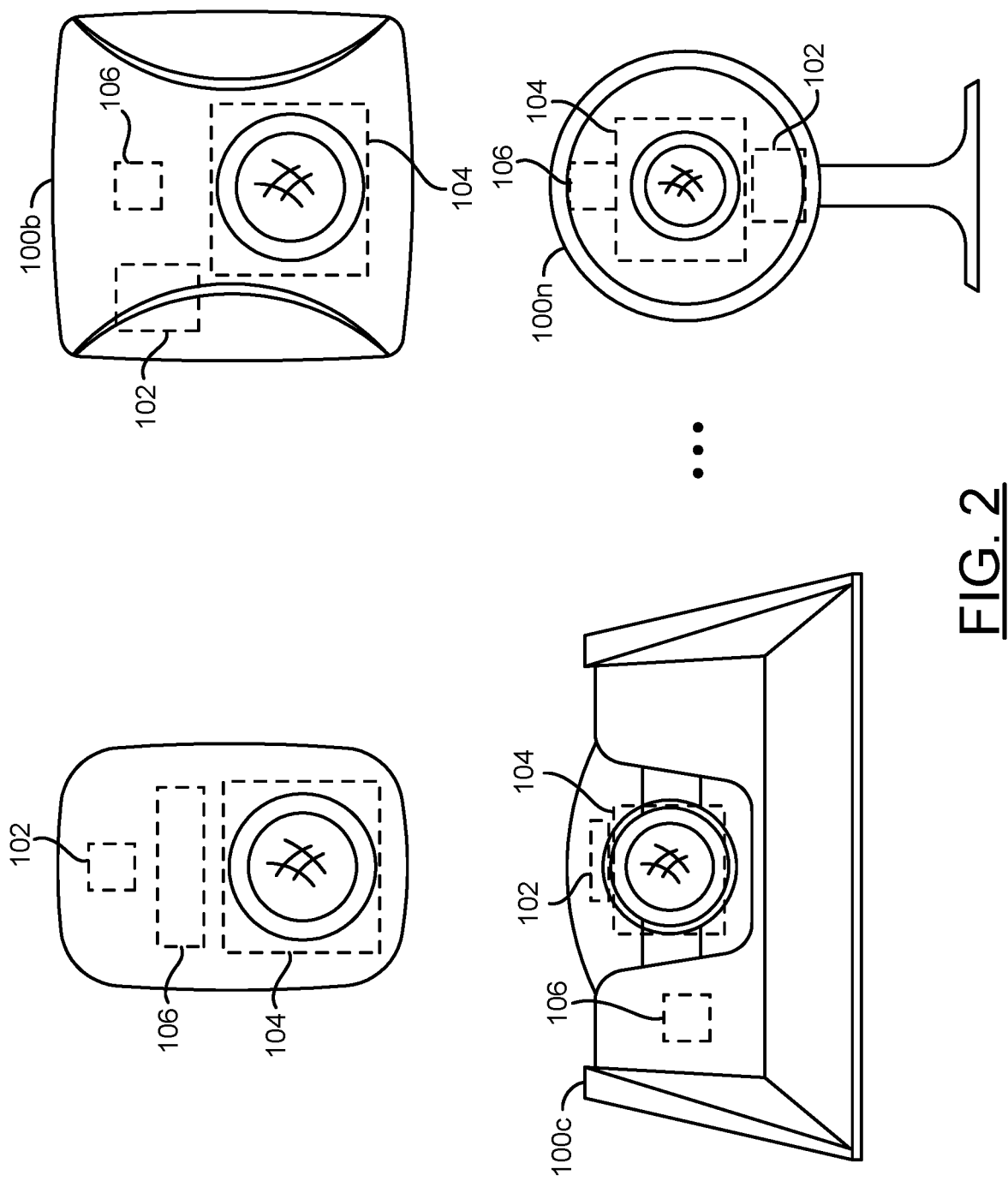
FIG. 2 is a diagram illustrating example cameras implementing an example embodiment of the present invention.

Referring to FIG. 2, a diagram illustrating example cameras implementing an example embodiment of the present invention is shown. The camera systems 100a-100n are shown. Each camera device 100a-100n may have a different style and/or use case. For example, the camera 100a may be a power over coax model, the camera 100b may be a ceiling mounted security camera, the camera 100n may be a webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement a radar module (e.g., a radar frontend). The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The radar module 106 may be configured to generate radar data. In an example, the radar module 106 may implement a mmWave radar device. While each of the cameras 100a-100n are shown implementing the radar module 106, some of the cameras 100a-100n may be implemented without the radar module 106 (e.g., the capture device 104 and the radar module 106 may be implemented on separate devices).

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., edge devices 100a-100n may operate independently from each other). For example, each of the cameras 100a-100n may individually analyze the pixel data captured and/or the radar data and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). In some embodiments, the capture device 104 may be implemented as part of an evaluation kit, along with the radar module 106. In the example shown, the edge devices 100a-100n are shown as non-automotive cameras. In some embodiments, the edge devices 100a-100n may be implemented as one or more sensors on a vehicle. Embodiments of the present invention may implement the image sensor (e.g., part of the capture device 104) and the radar module 106 on a single edge device. In some embodiments, the image sensor and the radar module 106 may be implemented on separate devices. The design of the edge device 100a-100n may be varied according to the design criteria of a particular implementation.

The FoV of the capture device 104 may overlap, or at least partially overlap, with the FoV of the radar module 106. The processor 102 may comprise a video interface and/or a radar interface. The video interface may enable the processor 102 to receive pixel data from the capture device 104. The radar interface may enable the processor 102 to receive raw radar data from the radar module 106. In some embodiments, the capture device 104 may perform processing of the pixel data and provide images and/or video frames to the video interface. In some embodiments, the radar module 106 may perform processing of the raw radar data and provide the radar data to the radar interface. The radar data interface and/or the video data interface may comprise a number of data ports. Additional interfaces (or a unified interface) may be implemented to enable the processor 102 to receive the pixel data, the radar data and/or data from other types of sensors (e.g., audio, infrared light, lidar, etc.). In some embodiments, the edge devices 100a-100n may comprise multiple capture devices and/or multiple radar modules and the interfaces may be configured to receive the radar data and/or image data from multiple sources.

The radar module 106 may be configured to determine a proximity and/or location of objects/obstacles around the edge devices 100a-100n. The radar module 106 may be configured as long-range and/or short-range sensors. The radar module 106 may be configured to generate a radar (or probe) signal, which may be reflected back to the radar module 106 by the object(s) near the edge devices 100a-100n. The reflected data received by the radar module 106 corresponding to the radar signal may be processed and/or analyzed in order to generate data about the objects in the environment near the edge devices 100a-100n. In some embodiments, the data generated by the radar module 106 may be used by the processor 102 to create a radar mapping of the environment.

The radar module 106 may be configured to emit a radio frequency pattern. The shape, intensity and/or direction of the radio frequency patterns may determine a detection range of the radar module 106. The radio frequency patterns may have a range of approximately 200 meters to 450 meters, with a 150 degree azimuth field of view and a 45 degree elevation field of view. The particular range of the radio frequency patterns may be varied according to the design criteria of a particular implementation.

The radar module 106 may implement an antenna array and/or waveguide network. The antenna array and/or waveguide network implemented by the radar module 106 may enable a sparse antenna array configured to provide information that may be used by the processor 102 to reconstruct a high resolution of data. In an example, the radar module 106 may be configured to generate a dynamic waveform and the processor 102 may use artificial intelligence to learn from and/or adapt to the environment near the edge devices 100a-100n. The sparse array implemented by the radar module 106 may enable a high resolution of data to be acquired with a low module cost. The radar module 106 may be configured to generate raw radar data at a low volume that may be converted to a high resolution of data while consuming between 3 watts to 10 watts of power. Details of the antenna array and/or waveguide network implemented by the radar module 106 may be described in association with U.S. application Ser. No. 17/945,379, filed on Sep. 15, 2022 and U.S. application Ser. No. 17/958,268, filed on Sep. 30, 2022, now U.S. Pat. No. 12,176,610, appropriate portions of which are incorporated by reference.

In one example, the processor 102 may implement a zone (or domain) processor. The processor 102 may implement a dataflow vector processor. The processor 102 may comprise a neural vector process (NVP) and a general vector processor (GVP). For example, the processor 102 may implement multiple parallel processors, multiple cores and/or particular processors/cores dedicated to particular tasks. In one example, the NVP may be configured to provide artificial intelligence (AI) performance that may enable detection, classification, tracking, etc. In another example, the GVP may be configured to enable computer vision operations, radar processing, floating-point intensive operations, etc.

The processor 102 may be configured to process raw datastreams generated by the radar module 106, the capture device 104 and/or other sensors. The processor 102 may be configured to implement deep sensor fusion in order to combine interpretations of the data from the radar module 106 with interpretations of the data from the capture device 104 and/or data inputs from other sensors (not shown) in order to make inferences using multiple sources of data that would not be possible based on one of the data sources alone. In an example, the processor 102 may be configured to interpret the high resolution data generated in response to the low volume data provided by the radar module 106. In another example, the processor 102 may be configured to perform computer vision operations on the video frames generated by the capture device 104 in order to detect objects.

The processor 102 may be configured to implement central compute capabilities that enable high performance without implementing a dedicated processor for the radar module 106. Implementing the processor 102 may enable the radar module 106 to be implemented at a lower cost because a dedicated processor may not be implemented for the radar module 106. The processor 102 may be configured to enable sparsity in the implementation of the radar module 106 in order to determine the boundary conditions for a particular resolution of data. The processor 102 may enable the radar module 106 to undersample the environment while preventing artifacts, grading lobes and/or false alarms.

The processor 102 may be configured to adaptively modulate the information generated by the radar module 106 to enable fewer antennas to be implemented in the antenna array of the radar module 106. Instead of processing data from the radar module 106 at the edge (e.g., one processor on-board with the same technology node for the radar module 106), the sparse (e.g., low volume) raw radar data from the radar module 106 may be processed by the processor 102. The sparse antenna array implemented by the radar module 106 may enable low bandwidth data to be transmitted from the radar module 106 to the processor 102. The processor 102 may be configured to expand the resolution of the data received from the radar module 106.

The processor 102 may utilize a dynamic adaptive waveform. The processor 102 may learn and/or adapt to the environment. The processor 102 may take advantage of sparsity to capture the boundary conditions for the data that may be used for providing a particular resolution. Sparsity may undersample the environment. To avoid grading lobes and/or artifacts that may result from multiple solutions that may be available for reconstructing a dense amount of data using sparsity, an adaptive waveform may be implemented. The adaptive waveform used for the radio frequency patterns may provide a shifting waveform that may be effectively controlled in a deterministic fashion. By adaptively modulating the information, fewer antennas may be used by the radar module 106. Artifacts from the sparsity may be suppressed by aggregating information that may be adaptive over time. The adaptive waveform implemented may provide a sparse radar data cube that may enable reconstructing a high resolution of radar detections that no longer scales with the number of antennas implemented by the radar module 106. The high resolution of the radar detections may scale with how efficiently the processor 102 performs computations and/or how quickly a phase may be modulated onto the adaptive transmitted signal.

Figure 3:
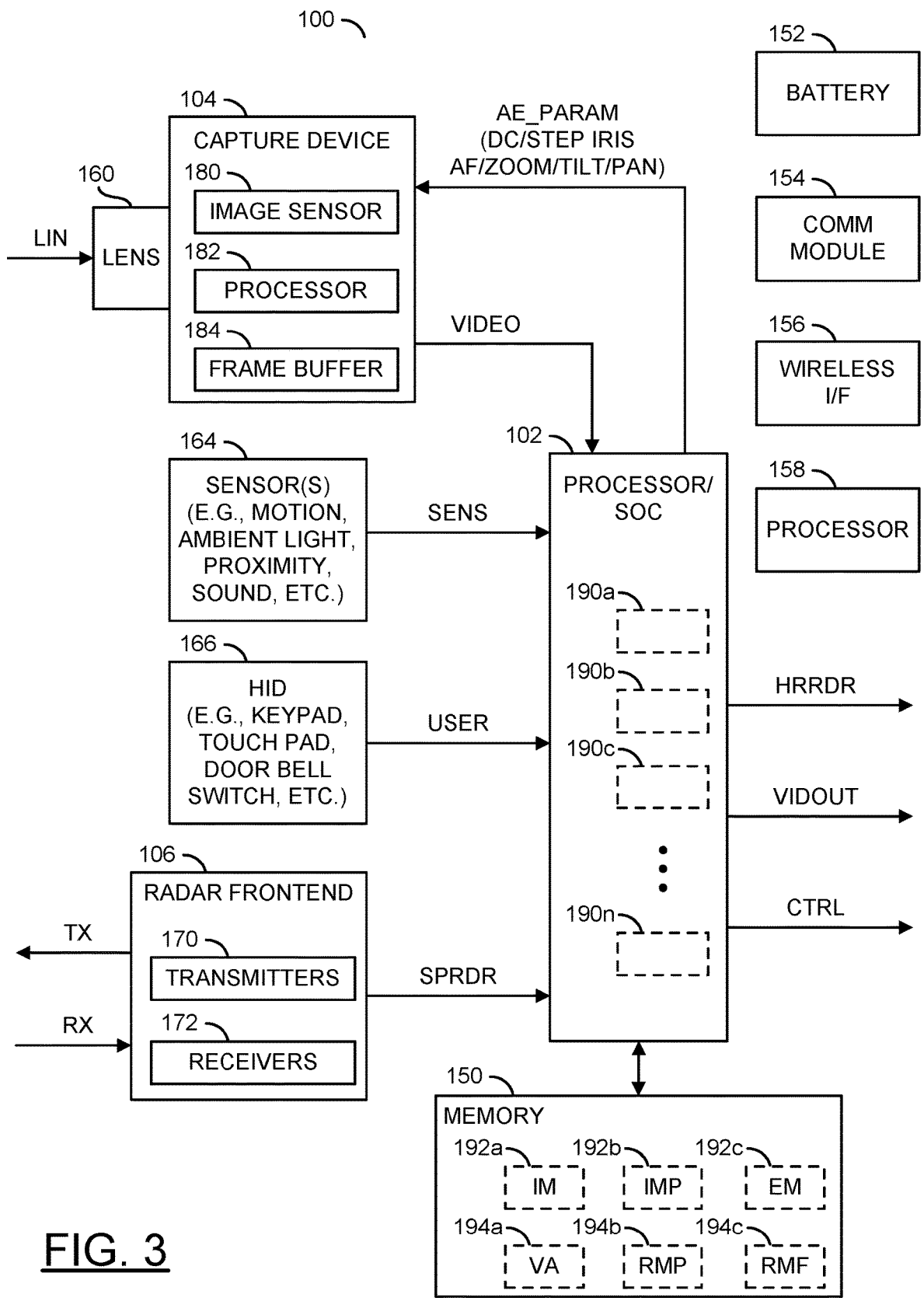
FIG. 3 is a block diagram illustrating a camera/radar system.

Referring to FIG. 3, a block diagram illustrating a camera/radar system is shown. The apparatus 100 may be a representative example of the edge devices shown in association with FIGS. 1-2. The apparatus 100 may comprise the capture device 104, the radar module 106 and/or the processor/SoC 102. The apparatus 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the apparatus 100 may comprise the processor/SoC 102, the capture device 104, the radar module 106, the memory 150, the lens 160, the sensors 164, the battery 152, the communication module 154, the wireless interface 156 and the processor 158. In another example, the apparatus 100 may comprise processor/SoC 102, the capture device 104, the processor 158, the lens 160, and the sensors 164 as one device, and the memory 150, the battery 152, the communication module 154, and the wireless interface 156 may be components of a separate device. The apparatus 100 may comprise other components (not shown). The number, type and/or arrangement of the components of the apparatus 100 may be varied according to the design criteria of a particular implementation.

The processor 102 may be implemented as a dataflow vector processor. The processor 102 may be configured to perform image/video processing and/or radar signal processing. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be configured to generate high resolution radar data.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, metadata information, radar data cubes, radar detections, etc. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In another example, the memory 150 may store one or more directed acyclic graphs (DAGs) and one or more sets of weights and biases defining the one or more artificial neural network models. In yet another example, the memory 150 may store instructions to perform transformation operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the apparatus 100. The dynamic driver mechanism for a rolling shutter sensor may be configured to conserve power consumption. Reducing the power consumption may enable the apparatus 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, a coaxial interface, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the apparatus 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the apparatus 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the apparatus 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the apparatus 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the dataflow vector processor 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the apparatus 100 (e.g., the battery 152, the communication module 154 and/or the wireless interface 156). Which of the functionality of the apparatus 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the apparatus 100 (e.g., a view for a video frame, a view for a panoramic video frame captured using multiple implementations of the apparatus 100 (e.g., 100a-100n), a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

The radar module 106 may comprise a block (or circuit) 170 and/or a block (or circuit) 172. The circuit 170 may implement a transmitter. The circuit 172 may implement a receiver. The radar module 106 may comprise other components (not shown). The number, type and/or arrangement of the components of the radar module 106 may be varied according to the design criteria of a particular implementation.

The transmitter 170 of the radar module 106 may be configured to generate a signal (e.g., TX). The signal TX may be output signals transmitted to the environment. In an example, the signal TX may be a probe signal. The probe signal TX may comprise individual waveform characteristics. In an example, a first probe signal TX generated by the transmitter 170 of the radar module 106 may comprise a first distinct (or unique or predefined) waveform characteristic, then a second probe signal TX generated by the transmitter 170 of the radar module 106 may comprise a second distinct (or unique or predefined) waveform, etc. In some embodiments, the probe signal TX may cycle through a predefined set of a number of distinct waveform characteristics. The types of the probe signal TX generated may be varied according to the design criteria of a particular implementation.

The transmitter 170 may comprise a waveform generation module, a modulation/coding module and/or a power amplification module. The waveform generation module may be configured to generate the probe signal TX comprising the various waveform characteristics. The modulation/coding module may be configured to select a communication frequency for the waveform characteristics for the probe signals TX. In an example, the modulation/coding module may select a high frequency carrier signal and/or channel for communicating the probe signal TX. The power amplification module may be configured to provide a power level for the probe signal TX. For example, in response to the power level selected by the power amplification module and the frequency selected by the modulation/coding module, the waveform generation module may output the probe signal TX from the transmitter 170 with the distinct waveform characteristics.

The receiver 172 of the radar module 106 may be configured to receive a signal (e.g., RX) and/or generate a signal (e.g., SPRDR). The signal RX may be input signals received from the environment. In an example, each of the probe signals TX may be reflected back from objects in the environment and received as the reflected signals RX. The receiver 172 may be configured to perform various operations on the reflected signals RX. For example, the operations performed by the receiver 172 may enable the various waveform characteristics of the transmitted signal TX to be extracted and/or isolated in the reflected signal RX. The reflected signal RX may correspond to the waveform characteristics of the probe signals TX.

The signal SPRDR may comprise raw radar data generated by the receiver 172. The operations performed by the receiver 172 may be configured to generate the raw radar data SPRDR in response to the reflected signal RX. Generally, the raw radar data SPRDR may comprise a low volume of data. For example, the low volume of data of the raw radar data SPRDR may be enabled because of the sparsity of the antenna arrays of the transmitter 170 and the receiver 172. In one example, the antenna arrays implemented by the transmitter 170 and/or the receiver 172 implementing the sparse antenna array may comprise twelve antenna heads.

The raw radar data SPRDR may be transmitted to the data network. The signal SPRDR may be presented by the radar module 106 to the processor 102.

The receiver 172 may comprise an analog to digital conversion (ADC), a demodulation module and/or a signal conditioning module. The ADC and/or the demodulation module may be configured to perform analog to digital conversion and/or demodulation operations on the reflected signal RX. The ADC operations may comprise sampling and/or quantization in order to convert the analog reflected signal RX to a digital version that may be operated on digitally. The demodulation operations may be configured to retrieve the waveform characteristics from the reflected signal RX that may have been adapted to a particular transmission channel. In an example, the demodulation operations may extract and/or isolate the waveform characteristics in the reflected signal RX (e.g., the unique characteristics that correspond to the probe signal TX). The signal conditioning module may be configured to prepare the reflected signal RX for communication via a data network of the apparatus 100. For example, in response to waveform characteristics extracted from the reflected signal RX by the demodulation module, the signal conditioning module may output the raw radar data SPRDR from the receiver 172.

In the example shown, transmitter 170 and/or the receiver 172 implemented by the radar module 106 may implement sparsity. For example, the radar module 106 may comprise the transmitters 170 and/or the receivers 172 without implementing a local memory and/or a local processor. For example, the radar module 106 may generate the raw radar data SPRDR with a low data volume, and rely on the centralized processing device 102 to generate a signal (e.g., HRRDR). The signal HRRDR may comprise high resolution data and/or radar detections generated in response to performing the radar signal processing on the raw radar data signal SPRDR.

In some embodiments, the radar module 106 may not implement sparsity. In the example where with the radar module 106 does not implement sparsity, a high volume of raw radar data may be generated. For example, the volume of data in the raw radar data SPRDR generated with sparsity may be less than the high volume of the raw radar data generated without sparsity (e.g., by a factor of sixteen).

The processor 102 may be configured to receive the low volume raw radar SPRDR from the radar module 106 (e.g., at the radar data interface). The processor 102 may be configured to perform virtual aperture imaging. The virtual aperture imaging may be configured to reconstruct high resolution detections based on the each of the sparse raw radar data in the signal SPRDR. The virtual aperture imaging may be configured to use the waveform characteristics in the raw radar data SPRDR in order to generate physical antenna data, extrapolated virtual antenna data and/or interpolated virtual antenna data. For example, the virtual aperture imaging may enable additional data points (e.g., the extrapolated virtual antenna data and/or the interpolated virtual antenna data) to be generated in order to provide a high resolution of data based on the sparse physical antenna data. The virtual aperture imaging may enable a dense array of virtual antenna data to be provided in response to the sparse arrangement of the physical antennas implemented by the radar module 106. Details of the virtual aperture imaging may be described in association with U.S. application Ser. No. 17/832,278 filed on Jun. 3, 2022 (issued as U.S. Pat. No. 11,561,299), U.S. application Ser. No. 17/556,221 filed on Dec. 20, 2021, now U.S. Pat. No. 11,860,267, U.S. application Ser. No. 16/704,409, filed Dec. 5, 2019 (issued as U.S. Pat. No. 11,243,304), U.S. application Ser. No. 16/503, 908, filed Jul. 5, 2019 (issued as U.S. Pat. No. 10,564,277), U.S. application Ser. No. 16/032,369, filed Jul. 11, 2018 (issued as U.S. Pat. No. 10,509,119), and U.S. application Ser. No. 15/883,372, filed Jan. 30, 2018 (issued as U.S. Pat. No. 10,048,366), appropriate portions of which are incorporated by reference.

The capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the apparatus 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the apparatus 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102 (e.g., at the video data interface via the data network). The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., the environment captured) and various subjects. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB video signal, an IR video signal and/or an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light. In various embodiments, the image sensor 180 may comprise an RGB sensor, an RGB-IR sensor, an RCCB sensor, a monocular image sensor, stereo image sensors, a thermal sensor, etc.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The capture device 104 may be configured to receive a signal (e.g., AE_PARAM). The signal AE_PARAM may be generated by the processor 102. The signal AE_PARAM may comprise auto exposure parameters generated by the AI metering technique implemented by the processor 102. The processor/logic 182 may be configured to adjust operating parameters of the capture device 104 in response to the signal AE_PARAM. In an example, the processor/logic 182 may adjust an exposure of the image sensor 180 in response to the signal AE_PARAM. In another example, the processor/logic 182 may adjust a DC iris and/or a shutter time for the image sensor 180 in response to the signal AE_PARAM. In yet another example, the processor/logic 182 may adjust a zoom/tilt/pan/focus of the capture device 104 in response to the signal AE_PARAM. In still another example, the processor/logic 182 may adjust the automatic gain control (AGC) of the image sensor 180 in response to the signal AE_PARAM. In some embodiments, the signal AE_PARAM may be configured to provide an activation and/or wakeup signal to the capture device 104. The types of adjustments made in response to the signal AE_PARAM to adjust an exposure, focus and/or capture direction of the capture device 104 may be varied according to the design criteria of a particular implementation.

The sensors 164 may implement a number of sensors including, but not limited to, motion sensors, ambient light sensors, proximity sensors (e.g., ultrasound, passive infrared, lidar, etc.), audio sensors (e.g., a microphone), etc. In embodiments implementing a motion sensor, the sensors 164 may be configured to detect motion anywhere in the field of view monitored by the apparatus 100 (or in some locations outside of the field of view). In various embodiments, the detection of motion may be used as one threshold for activating the capture device 104. The sensors 164 may be implemented as an internal component of the apparatus 100 and/or as a component external to the apparatus 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the apparatus 100. In another example, the sensors 164 may generate (assert) the signal SENS when triggered by audio in the field of view monitored by the apparatus 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. The HID 166 may generate a signal (e.g., USER). The signal USER may provide the input received by the HID 166 to the processor 102. The signal USER may comprise the human input. In one example, the HID 166 may be configured to receive a password input from a user. In another example, the HID 166 may be configured to receive user input in order to provide various parameters and/or settings to the processor 102 and/or the memory 150. For example, the signal USER may comprise FFT and/or data size information for the transformation operations. In some embodiments, the apparatus 100 may include a keypad, a touch pad (or screen), a doorbell switch, and/or other human interface devices (HIDs) 166. In an example, the sensors 164 may be configured to determine when an object is in proximity to the HIDs 166. In an example where the apparatus 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO, the signal SPRDR, the signal SENS and/or the signal USER. The processor/SoC 102 may generate one or more radar detection signals HRRDR, video output signals (e.g., VIDOUT) and/or one or more control signals (e.g., CTRL) based on the signal VIDEO, the signal SPRDR, the signal SENS, the signal USER and/or other input. In some embodiments, the signals VIDOUT and CTRL may be generated based on analysis of the signal VIDEO and/or objects detected in the signal VIDEO. In some embodiments, the signals HRRDR and CTRL may be generated based on radar signal processing of the signal SPRDR and/or radar detections in the signal SPRDR. In some embodiments, the signals HRRDR, VIDOUT and CTRL may be generated based on centralized sensor fusion operations performed in response to a combination of the video analysis of the signal VIDEO, the radar signal processing of the signal SPRDR and/or other sensor data.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal comprising disparity maps and depth maps from the signal VIDEO. The video output signal VIDOUT and/or the depth data may be presented to the memory 150, the communications module 154, and/or the wireless interface 156. In some embodiments, the video signal VIDOUT and/or the depth data may be used internally by the processor 102 (e.g., not presented as output).

The signal HRRDR and/or the signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal HRRDR and/or the signal VIDOUT may be data generated by the processor 102 (e.g., video analysis results, audio/speech analysis results, radar processing analysis, etc.) that may be communicated to a cloud computing service in order to aggregate information and/or provide training data for machine learning (e.g., to improve object detection, to improve audio detection, to improve liveness detection, etc.). In some embodiments, the signal HRRDR and/or the signal VIDOUT may be provided to a cloud service for mass storage (e.g., to enable a user to retrieve the encoded video using a smartphone and/or a desktop computer). In some embodiments, the signal HRRDR and/or the signal VIDOUT may comprise the data extracted from the video frames (e.g., the results of the computer vision) and/or radar signal processing, and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal HRRDR and/or the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on objects and/or distances to objects detected in response to the radar signal processing performed by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The multi-step approach to activating and/or disabling the capture device 104 and/or the radar module 106 based on the output of the motion sensor 164 and/or any other power consuming features of the apparatus 100 may be implemented to reduce a power consumption of the apparatus 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics and/or the radar signal processing performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The apparatus 100 may be configured to operate using various power states. For example, in the power-down state (e.g., a sleep state, a low-power state) the motion sensor of the sensors 164 and the processor/SoC 102 may be on and other components of the apparatus 100 (e.g., the image capture device 104, the radar module 106, the memory 150, the communications module 154, etc.) may be off. In another example, the apparatus 100 may operate in an intermediate state. In the intermediate state, the image capture device 104 and/or the radar module 106 may be on and the memory 150 and/or the communications module 154 may be off. In yet another example, the apparatus 100 may operate in a power-on (or high power) state. In the power-on state, the sensors 164, the processor/SoC 102, the capture device 104, the radar module 106, the memory 150, and/or the communications module 154 may be on. The apparatus 100 may consume some power from the battery 152 in the power-down state (e.g., a relatively small and/or minimal amount of power). The apparatus 100 may consume more power from the battery 152 in the power-on state. The number of power states and/or the components of the apparatus 100 that are on while the apparatus 100 operates in each of the power states may be varied according to the design criteria of a particular implementation.

In some embodiments, the apparatus 100 may be implemented as a system on chip (SoC). For example, the apparatus 100 may be implemented as a printed circuit board comprising one or more components. The apparatus 100 may be configured to perform intelligent video analysis on the video frames of the video. The apparatus 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the apparatus 100 (e.g., provides nightvision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the radar module 106, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the apparatus 100. However, the computer vision operations performed using the feature set may be performed using the computational resources of the processor 102 within the apparatus 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. The processor 102 may comprise a neural vector processor and a general vector processor. In one example, the neural vector processor may be configured to provide AI performance that may enable detection, classification, tracking, etc. In another example, the general vector processor may be configured to enable computer vision operations, radar processing, floating-point intensive operations, etc. In some embodiments, other processors implemented by the apparatus 100 may be generic processors and/or video processors (e.g., a coprocessor that is physically a different chipset and/or silicon from the processor 102).

In some embodiments, the processor 102 may implement an image signal processor that may enable multi-exposure, line-interleaved high dynamic range (HDR), real time multi-scale/multi-field of view (FoV) generation, hardware dewarping engine support, multiple camera support, support for RGGB/RCCB/RCCC/RGB-IR/monochrome sensors, etc. In some embodiments, the processor 102 may implement a dense stereo and optical flow engine configured to implement generic obstacle detection, terrain modeling, etc. In some embodiments, the processor 102 may implement a graphics processing unit configured as an automotive GPU for 3D surround-view rendering and/or generating output to a display (e.g., an infotainment unit). In some embodiments, the processor 102 may support hardware for high-efficiency video encoding such as H.265, H.264, MJPEG, etc. video encoding and provide flexible multi-streaming capability. In some embodiments, portions of the processing may be isolated to provide functional safety (e.g., a processing island targeted to meet ASIL B specifications, a safety island targeted to meet ASIL D specifications, error correcting code (ECC) protection of DRAM, a central error handling unit (CEHU), etc.). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline and/or a radar signal processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). The circuits 190a-190n may be configured to receive the sparse radar data SPRDR and perform various operations on the radar data (e.g., DCT, FFT, DFT, virtual aperture imaging, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, now U.S. Pat. No. 11,586,843, U.S. patent application Ser. No. 16/288,922, filed on Feb. 28, 2019, now U.S. Pat. No. 11,001,231, U.S. patent application Ser. No. 15/593,463 (now U.S. Pat. No. 10,437,600), filed on May 12, 2017, U.S. patent application Ser. No. 15/931,942, filed on May 14, 2020, now U.S. Pat. No. 11,645,706, U.S. patent application Ser. No. 16/991,344, filed on Aug. 12, 2020, now U.S. Pat. No. 12,374,107, U.S. patent application Ser. No. 17/479,034, filed on Sep. 20, 2021, now U.S. Pat. No. 12,002,229, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the apparatus 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One or more of the hardware modules 190a-190n may be configured to implement other types of AI models. In one example, the hardware modules 190a-190n may be configured to implement an image-to-text AI model and/or a video-to-text AI model. In another example, the hardware modules 190a-190n may be configured to implement a Large Language Model (LLM). Implementing the AI model(s) using the hardware modules 190a-190n may provide AI acceleration that may enable complex AI tasks to be performed on an edge device such as the edge devices 100a-100n.

One of the hardware modules 190a-190n may be configured to perform the virtual aperture imaging. One of the hardware modules 190a-190n may be configured to perform transformation operations (e.g., FFT, DCT, DFT, etc.). The number, type and/or operations performed by the hardware modules 190a-190n may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

The memory 150 may comprise a number of blocks 192a-192c and/or a number of blocks 194a-194c. The blocks 192a-192c and/or the blocks 194a-194c may comprise data storage. While the data storage 192a-192c and/or the data storage 194a-194c are shown as individual discrete blocks as an illustrative example, the various data stored in the data storage 192a-192c and/or the data storage 194a-194c may be stored throughout the memory 150. While the data storage 192a-192c and the data storage 194a-194c are shown, the memory 150 may store additional data (not shown). The amount of data stored, the storage format and/or the type of data stored by the data storage 192a-192c and/or the data storage 194a-194c may be varied according to the design criteria of a particular implementation.

The data storage 192a-192c may comprise camera correction data. The camera correction data 192a-192c may be configured to implement an image coordinate transformation (e.g., to convert from an image coordinate system of the images and/or video frames to a real-world coordinate system of the environment). The camera correction data 192a may comprise an intrinsic matrix (e.g., for correcting errors caused by physical characteristics of the capture device 104 and/or for determining an optical center of the capture device 104). The camera correction data 192b may comprise image mapping points (e.g., to establish a correlation between image coordinates and real world coordinates). The camera correction data 194c may comprise an extrinsic matrix (e.g., transfer and/or project image coordinates to real world coordinates). The camera correction data 192a-192c may be generated during a prepare stage (e.g., offline, at a manufacturing time, before a runtime, etc.) and used during a runtime of the capture device 104. For example, the processor 102 may access the camera correction data 192a-192c to perform the image coordinate transformation.

The data storage 194a-194c may comprise radar correction data. The radar correction data 194a-194c may be configured to implement a radar coordinate transformation (e.g., to convert from a radar coordinate system of the radar data to the image coordinate system of the images and/or video frames). The radar correction data 194a may comprise a valid area (e.g., to filter invalid data and/or select a data format). The radar correction data 194b may comprise radar mapping points (e.g., to bind radar coordinates to the image coordinates to create a mapping function). The radar correction data 194c may comprise a radar mapping function (e.g., to transform radar coordinates to image coordinates). The radar correction data 194a-194c may be generated during a prepare stage (e.g., offline, at a manufacturing time, before a runtime, etc.) and used during a runtime of the radar module 106. For example, the processor 102 may access the radar correction data 194a-194c to perform the radar coordinate transformation.

Figure 4:
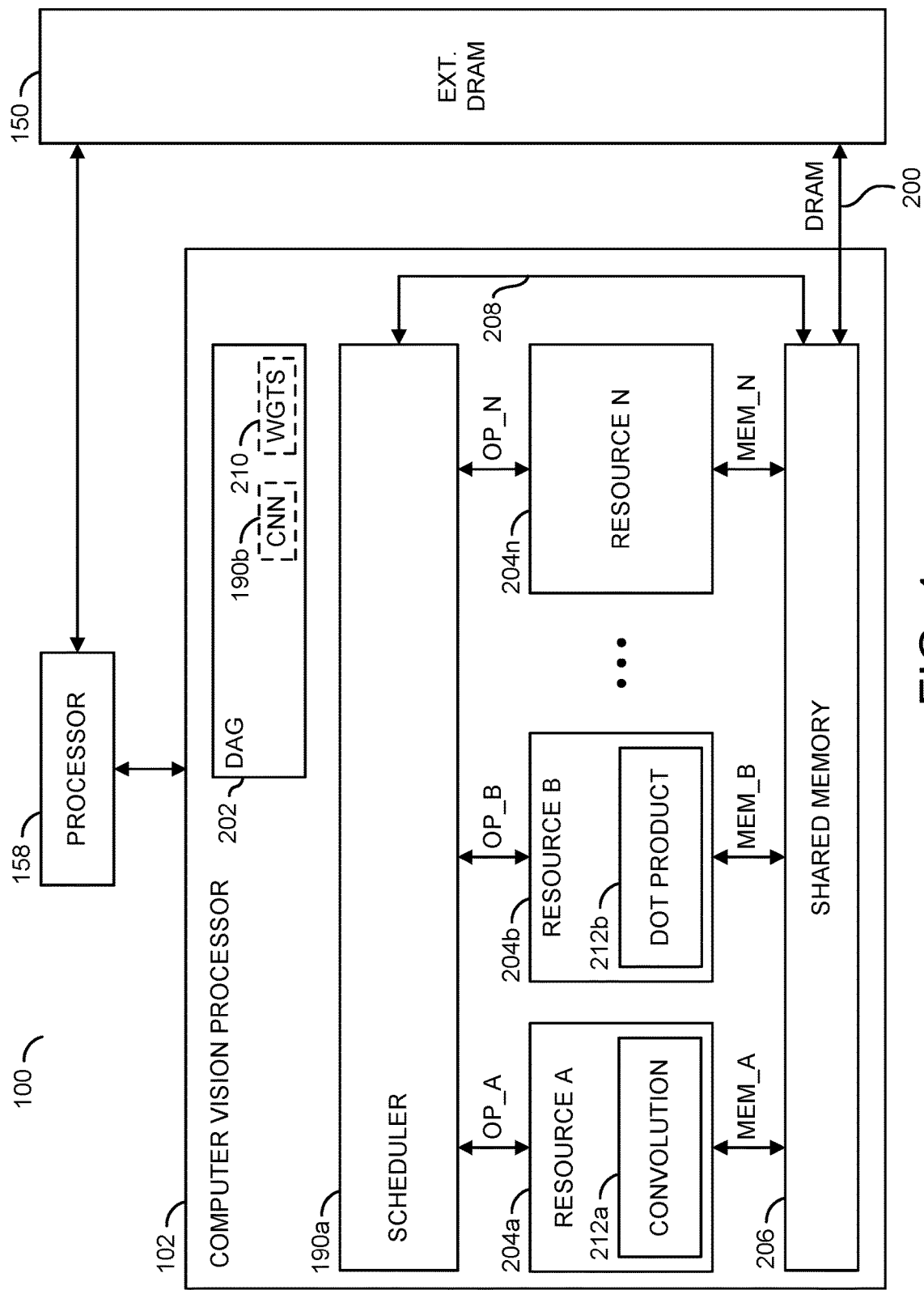
FIG. 4 is a diagram illustrating processing circuitry of a camera system implementing a convolutional neural network configured to perform object-based detection using neural network models.

Referring to FIG. 4, a diagram illustrating processing circuitry of a camera system implementing a convolutional neural network configured to perform object-based detection using neural network models is shown. In an example, processing circuitry of the apparatus 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the apparatus 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation, virtual aperture imaging, high resolution radar reconstruction, radar object detection and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In another example, the processor 102 may be an intelligent vision processor. In yet another example, the processor 102 may be a dataflow vector processor. In still another example, the processor 102 may be a radar signal processor. The memory 150 may implement an external memory (e.g., a memory external to the circuits 158 and 102). In an example, the circuit 150 may be implemented as a dynamic random access memory (DRAM) circuit. The processing circuitry of the apparatus 100 may comprise other components (not shown). The number, type and/or arrangement of the components of the processing circuitry of the apparatus 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the apparatus 100 may be coupled to a sensor (e.g., video camera, etc.) configured to generate a data input. The processing circuitry of the apparatus 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision and/or radar signal processing. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors, radar signal processors and/or AI acceleration processors implemented by the processing circuitry of the apparatus 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190*b* using the circuits 190*a*, 204*a*-204*n*, and 206.

Multiple signals (e.g., OP_A-OP_N) may be exchanged between the circuit 190*a* and the respective circuits 204*a*-204*n*. Each of the signals OP_A-OP_N may convey execution operation information and/or yield operation information. Multiple signals (e.g., MEM_A-MEM_N) may be exchanged between the respective circuits 204*a*-204*n* and the circuit 206. The signals MEM_A-MEM_N may carry data. A signal (e.g., DRAM) may be exchanged between the circuit 150 and the circuit 206. The signal DRAM may transfer data between the circuits 150 and 190*a* (e.g., on the transfer path 208).

The scheduler circuit 190*a* is generally operational to schedule tasks among the circuits 204*a*-204*n* to perform a variety of computer vision, radar signal processing and/or AI acceleration related tasks as defined by the processor 158. Individual tasks may be allocated by the scheduler circuit 190*a* to the circuits 204*a*-204*n*. The scheduler circuit 190*a* may allocate the individual tasks in response to parsing the directed acyclic graphs (DAGs) provided by the processor 158. The scheduler circuit 190*a* may time multiplex the tasks to the circuits 204*a*-204*n* based on the availability of the circuits 204*a*-204*n* to perform the work.

Each circuit 204*a*-204*n* may implement a processing resource (or hardware engine). The hardware engines 204*a*-204*n* are generally operational to perform specific processing tasks. The hardware engines 204*a*-204*n* may be implemented to include dedicated hardware circuits that are optimized for high-performance and low power consumption while performing the specific processing tasks. In some configurations, the hardware engines 204*a*-204*n* may operate in parallel and independent of each other. In other configurations, the hardware engines 204*a*-204*n* may operate collectively among each other to perform allocated tasks.

The hardware engines 204*a*-204*n* may be homogenous processing resources (e.g., all circuits 204*a*-204*n* may have the same capabilities) or heterogeneous processing resources (e.g., two or more circuits 204*a*-204*n* may have different capabilities). The hardware engines 204*a*-204*n* are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204*a*-204*n* may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204*a*-204*n* implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204*a*-204*n* may be implemented solely as hardware circuits. In some embodiments, the hardware engines 204*a*-204*n* may be implemented as generic engines that may be configured through circuit customization and/or software/firmware to operate as special purpose machines (or engines). In some embodiments, the hardware engines 204*a*-204*n* may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204*a*-204*n* may be selected for a particular process and/or thread by the scheduler 190*a*. The scheduler 190*a* may be configured to assign the hardware engines 204*a*-204*n* to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190*a* and/or the hardware engines 204*a*-204*n*). In an example, the shared memory circuit 206 may implement an on-chip memory for the dataflow vector processor 102. The shared memory 206 is generally operational to store all of or portions of the multidimensional arrays (or vectors) of input data elements and output data elements generated and/or utilized by the hardware engines 204*a*-204*n*. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190*a* to the shared memory 206. The transfer path 208 may also be operational to move data from the shared memory 206 to the scheduler circuit 190*a*.

The processor 158 is shown communicating with the dataflow vector processor 102. The processor 158 may be configured as a controller for the dataflow vector processor 102. In some embodiments, the processor 158 may be configured to transfer instructions to the scheduler 190*a*. For example, the processor 158 may provide one or more directed acyclic graphs to the scheduler 190*a* via the DAG memory 202. The scheduler 190*a* may initialize and/or configure the hardware engines 204*a*-204*n* in response to parsing the directed acyclic graphs. In some embodiments, the processor 158 may receive status information from the scheduler 190*a*. For example, the scheduler 190*a* may provide a status information and/or readiness of outputs from the hardware engines 204*a*-204*n* to the processor 158 to enable the processor 158 to determine one or more next instructions to execute and/or decisions to make. In some embodiments, the processor 158 may be configured to communicate with the shared memory 206 (e.g., directly or through the scheduler 190*a*, which receives data from the shared memory 206 via the path 208). The processor 158 may be configured to retrieve information from the shared memory 206 to make decisions. The instructions performed by the processor 158 in response to information from the dataflow vector processor 102 may be varied according to the design criteria of a particular implementation.

Figure 5:
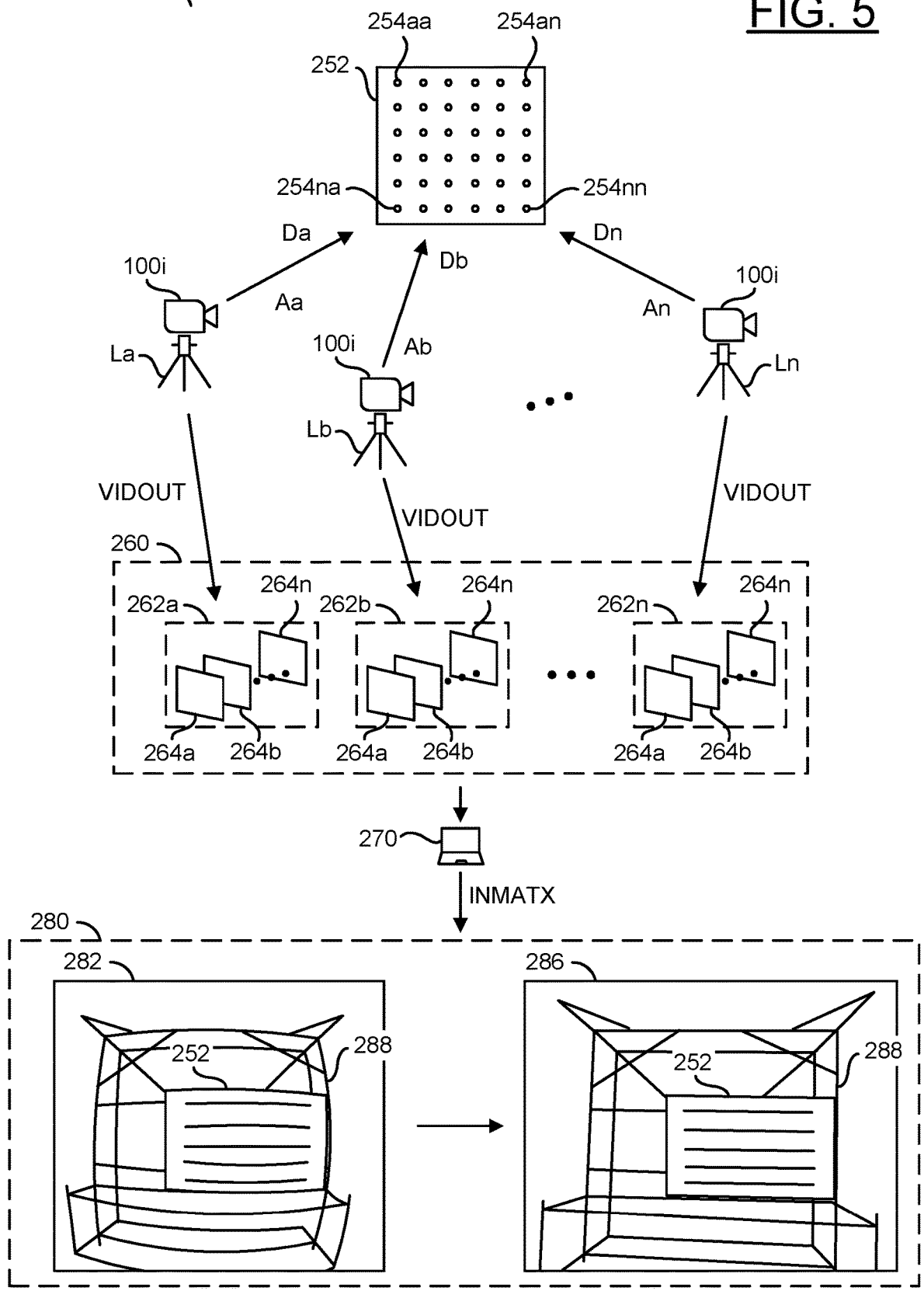
FIG. 5 is a diagram illustrating a single lens calibration.

Referring to FIG. 5, a diagram illustrating a single lens calibration is shown. A lens calibration technique 250 is shown. The lens calibration technique 250 may comprise a calculation of the intrinsic matrix 192*a* for the image sensor 180 using a calibration method. The lens calibration technique 250 may be implemented to perform a lens distortion correction (LDC) and/or to determine an optical center of the capture device 104. The lens distortion correction may be configured to eliminate, reduce and/or minimize lens distortion errors caused by intrinsic characteristics of the lens 160. For example, the lens 160 of each of the edge devices 100*a*-100*n* may have unique physical properties that may result in lens distortion. The type and/or amount of distortion caused by the lens 160 may not be known in advance. While some lenses may, by chance, happen to cause the same lens distortion, generally, each lens 160 may have unique distortion. The lens calibration technique 250 may be performed at a manufacture time for each of the edge devices 100*a*-100*n*. The intrinsic matrix 192*a* may further correct errors related to other intrinsic characteristics of the capture device 104 (e.g., focal length, pixel size, image origin, etc.). The intrinsic matrix 192*a* may provide a position of the optical center for the capture device 104.

The intrinsic matrix 192*a* may be generated in response to the lens calibration technique 250. The lens calibration technique 250 may be performed on each of the edge devices 100*a*-100*n* in order to prevent and/or limit lens distortion errors in subsequent calculations. Each of the edge devices 100*a*-100*n* may have an individual intrinsic matrix 192*a*. In some embodiments, the intrinsic matrix 192*a* may be unique to each of the edge devices 100*a*-100*n*. In some embodiments, the lens calibration technique 250 may result in the same intrinsic matrix 192*a* for one or more of the edge devices 100*a*-100*n* (e.g., multiple of the edge devices 100*a*-100*n* have the lens 160 with the same physical characteristics).

In one example, the lens calibration technique 250 may comprise mathematical modeling. In another example, the lens calibration technique 250 may comprise a Zhang Zhengyou Calibration method. In yet another example, the lens calibration technique 250 may comprise a Jean Yves Bouguet camera calibration method. In still another example, the lens calibration technique 250 may be a lens distortion correction available in OpenCV. In another example, the lens calibration technique 250 may comprise the quick calibration verification for mass production process described in association with U.S. patent application Ser. No. 17/721,392, filed on Apr. 15, 2022, now U.S. Pat. No. 11,743,450, appropriate portions of which are incorporated by reference. The particular lens calibration technique 250 implemented may be varied according to the design criteria of a particular implementation.

The lens calibration technique 250 may comprise a calibration target 252. The calibration target 252 may be a full calibration chart. The calibration target 252 may comprise a dot pattern 254*aa*-254*nn*. In the example shown, the dot pattern 254*aa*-254*nn* may comprise a grid with a number of columns and rows for the dot pattern 254*aa*-254*nn*. In one example shown, the calibration target 252 may be a 1 meter by 1 meter dot pattern board. The dot pattern 254*aa*-254*nn* may comprise a pattern of dots that may be precisely located on the calibration target 252 to enable the lens calibration technique 250. In some embodiments, the dot pattern 254*aa*-254*nn* may comprise dots having different sizes. In some embodiments, the dot pattern 254*aa*-254*nn* may comprise dots having a consistent size and/or spacing. The dot pattern 254*aa*-254*nn* may provide a reference pattern to enable the lens calibration technique 250 to calculate a warp table (e.g., the intrinsic matrix 192*a*) with a perfect dewarp effect for the particular lens 160 implemented by each of the edge devices 100*a*-100*n*.

The edge device 100*i* is shown performing the lens calibration technique 250. The edge device 100*i* performing the lens calibration technique 250 is shown as a representative example of performing the lens calibration technique 250 for each of the edge devices 100*a*-100*n*. The edge device 100*i* is shown at various locations (e.g., La-Ln). The locations La-Ln may each be at a particular angle and distance from the calibration target 252. In one example, the location La may be a distance Da and an angle Aa from the calibration target 252, the location Lb may be a distance Db and an angle Ab from the calibration target 252, the location Lc may be a distance Dc and an angle Ac from the calibration target 252, etc. In one example, the distance Da may be approximately 1.5 meters away from the calibration target 252. The capture device 104 may be configured to capture one or more images of the calibration target 252 at each of the locations La-Ln. For example, a person may manually place the edge device 100*i* at the location La, take a number of images of the calibration target 252, move the edge device 100*i* to the location Lb, take a number of images of the calibration target 252, etc. In the example shown, the calibration target 252 may be stationary, and the edge device 100*i* may be moved to each of the locations La-Ln. In some embodiments, the edge device 100*i* may be kept stationary, and the calibration target 252 may be moved with respect to the edge device 100*i* such that the edge device 100*i* may capture the calibration target 252 at the various distances Da-Dn and angles Aa-An. The edge device 100*i* is shown generating the signal VIDOUT at each of the locations La-Ln.

A block 260 is shown. The signal VIDOUT from each of the locations La-Ln is shown directed to the block 260. The block 260 may comprise calibration test images. The calibration test images 260 may comprise blocks 262*a*-262*n*. The blocks 262*a*-262*n* may each comprise a calibration test image set. Each of the calibration test image sets 262*a*-262*n* may comprise video frames 264*a*-264*n*. Each of the video frames 264*a*-264*n* may comprise pixel data and/or images captured at a particular one of the locations La-Ln and/or captured at the distances Da-Dn and angles Aa-An from the calibration target 252. For example, the video frames 264*a*-264*n* of the calibration test image set 262*a* may comprise images captured at the location La comprising a view of the calibration target 252 from a distance Da and angle Aa. In another example, the video frames 264*a*-264*n* of the calibration test image set 262*b* may comprise images captured at the location Lb comprising a view of the calibration target 252 from a distance Db and angle Ab.

A block (or circuit) 270 is shown. The circuit 270 may be a processing device. In the example shown, the processing device 270 may be a portable computer (e.g., a laptop, a netbook, a tablet computing device, etc.). The calibration test images 260 may be presented to the processing device 270. The processing device 270 may be configured to generate the warp table (e.g., the intrinsic matrix 192a) for the edge device 100i based on the calibration test images 260. A signal (e.g., INMATX) may be generated by the processing device 270. The signal INMATX may comprise the distortion correction coefficients for the intrinsic matrix 192a. In some embodiments, the processor 102 may be configured to calculate the distortion correction coefficients locally on the edge device 100i (e.g., instead of communicating the calibration test images 260 to an external device such as the processing device 270).

After the intrinsic matrix 192a is applied to the edge device 100i, another set of the calibration test images 260 may be generated in order to perform an evaluation of the result. If the evaluation result is determined to be not good enough (e.g., insufficient accuracy of the dewarp result), then the calibration images may have to be re-captured and an updated intrinsic matrix 192a may be re-calculated. For example, the processing device 270 may store pre-defined known values for the dot pattern 254aa-254nn in a memory (e.g., the total number of dots (e.g., rows and columns) and the distances between the dots in the dot pattern 254aa-254nn for the calibration target 252 may be known (and stored) in advance). The pre-defined known values may be the target values (e.g., gold standard or perfect values) for the calibration result. Multiple iterations of capturing calibration images may be performed, depending on the accuracy of the distortion correction coefficient generated, for the lens calibration technique 250 to generate an accurate intrinsic matrix 192a for the camera system 100i. The intrinsic matrix 192a may be stored in the memory 150 of the edge device 100i.

A correction result 280 is shown. The correction result 280 may comprise an uncalibrated image 282. The uncalibrated image 282 may be generated without applying the intrinsic matrix 192a to dewarp the output. The uncalibrated image 282 may comprise the calibration target 252. Distorted lines 284 are shown in the uncalibrated image 282. The distorted lines 284 may be caused by the distortion of the lens 160. The correction result 280 may comprise a calibrated image 286. The calibrated image 286 may be generated after the processor 102 applies the intrinsic matrix 192a to dewarp the output. The calibrated image 286 may comprise the calibration target 252. Rectilinear lines 288 are shown in the calibrated image 286. The rectilinear lines 288 may provide output similar to what a person would see when looking at the calibration target 252.

Generating the intrinsic matrix 192a may be one phase of calibrating the edge devices 100a-100n. After the intrinsic matrix 192a has been stored, further corrections and/or calibration may be performed.

Figure 6:
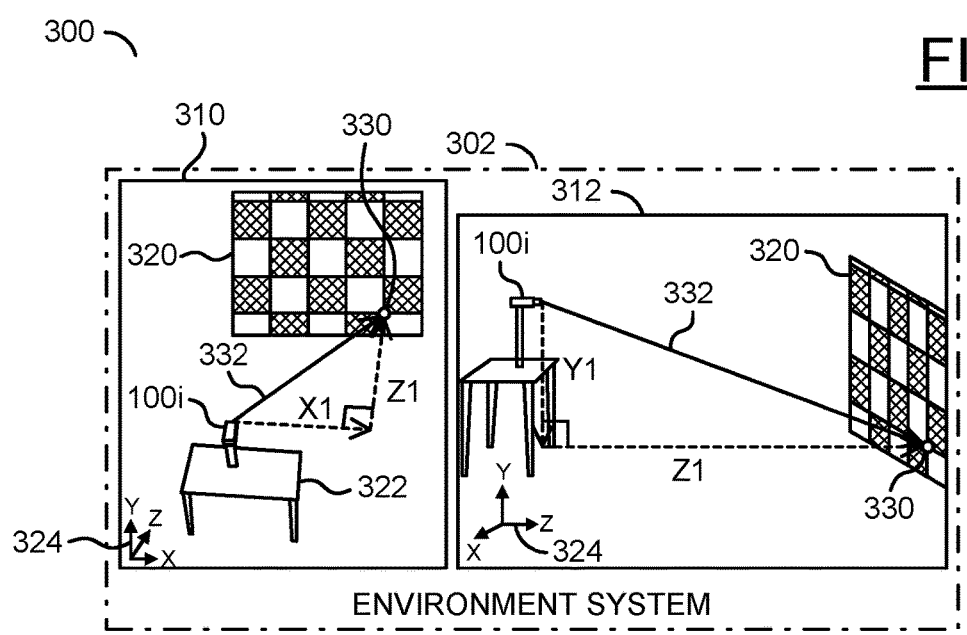
FIG. 6 is a diagram illustrating performing image correction to generate image mapping points for an image sensor to an environment.
Figure 6:
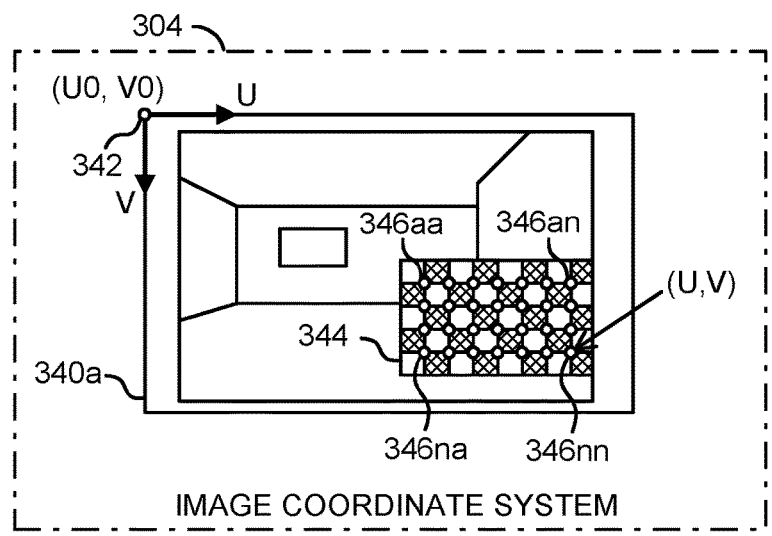
Figure 6:
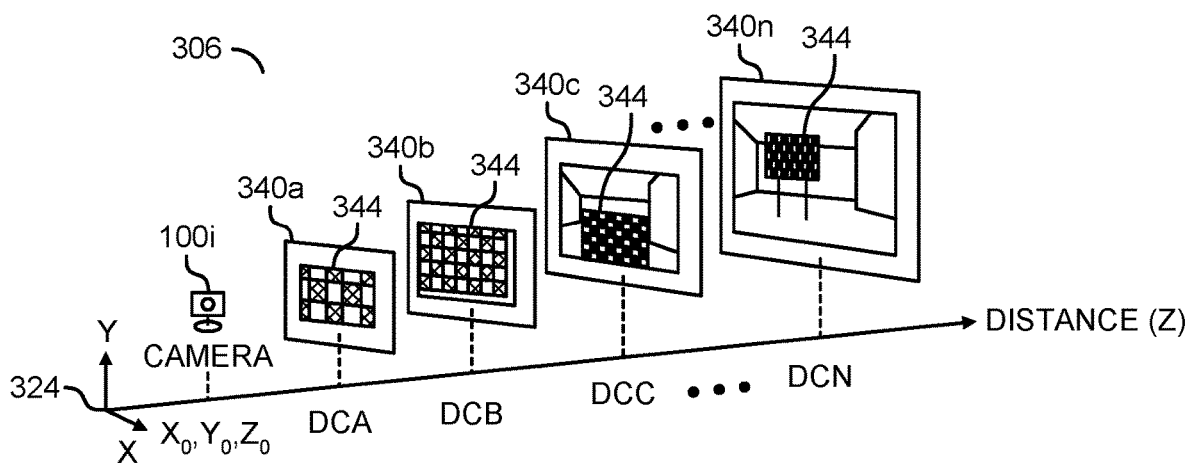

Referring to FIG. 6, a diagram illustrating performing image correction to generate image mapping points for an image sensor to an environment is shown. An image correction technique 300 is shown. The image correction technique 300 may be configured to prepare and/or generate calibration data points (e.g., the image mapping points 192b). The calibration data points may be generated for mapping from an environment (e.g., world) coordinate system to an image coordinate system. The image correction technique 300 may be implemented to establish a correlation between the environment coordinates (e.g., a three dimensional (X,Y,Z) coordinate system) and the image coordinates (e.g., a two dimensional (U,V) coordinate system).

The image correction technique 300 may comprise capturing a set of images of a test pattern from multiple distances. The image correction technique 300 may comprise a test pattern capture 302, a mapping point capture 304 and/or capturing a correction test image set 306. The test pattern used for the image correction technique 300 may be different than the test pattern of the calibration target 252 used for the lens calibration technique 250. The image correction technique 300 may be configured to generate the image mapping points 192b as shown in association with a table (e.g., TABLE 1):

| Calibration Data | X | Y | Z | U | V |
|---|---|---|---|---|---|
| Image Mapping Point 1 | | | | | |
| Image Mapping Point 2 | | | | | |
| ... | | | | | |
| Image Mapping Point 3 | | | | | |

The test pattern capture 302 may comprise a first view 310 and a second view 312. The first view 310 may provide a top down view of the environment. The second view 312 may provide aside view of the environment. The first view 310 and the second view 312 may illustrate the edge device 100i capturing a test pattern image of a correction target 320. The edge device 100i is shown standing on a table 322. An environment coordinate system 324 (e.g., X,Y,Z coordinates) are shown as a reference in the first view 310 and the second view 312. The edge device 100i is shown as a representative example of capturing test pattern images using the edge devices 100a-100n. For each of the edge devices 100a-100n, after the intrinsic matrix 192a has been generated and applied, then the edge devices 100a-100n may be used to capture the test pattern images. For example, the image mapping points 192b may be generated based on test images captured after the lens distortion correction of the intrinsic matrix 192a has been applied (e.g., due to the influence of the optical center and/or other distortion factors that may be corrected by the intrinsic matrix 192a, each test image captured may vary for each of the edge devices 100a-100n, which may result in the image coordinates (U,V) being slightly different for each of the edge devices 100a-100n).

The correction target 320 may comprise a test pattern. The test pattern for the correction target 320 may comprise a checkerboard pattern comprising alternating dark squares and light squares (e.g., black and white squares). The corners of the dark squares and light squares may intersect. An example intersection point 330 (or corner point) is shown on the correction target 320. The FoV of the capture device 104 may capture the correction target 320 with the intersection point 330.

Areal world measurement 332 is shown. The real world measurement 332 may be performed for the intersection point 330. The real world measurement 332 of the intersection point 330 may comprise a distance in the environment coordinate system 324 of the lens 160 of the edge device 100i to the intersection point 330. In the first view 310 an X coordinate and Z coordinate measurement of X1,Z1 from the lens 160 to the intersection point 330 is shown. In the second view 312 a Y coordinate and Z coordinate measurement of Y1,Z1 from the lens 160 to the intersection point 330 is shown. The real world measurement 332 for one of the image mapping points 192b (e.g., IMAGE MAPPING POINT 1) may be X1,Y1,Z1, which may be added to an entry of a collection of image mapping points 192b (e.g., the real world coordinates may be added to an X,Y,Z entry in the mapping table TABLE 1).

The mapping point capture 304 may comprise an example image 340a. The example image 340a may be one image from a sequence of images 340a-340n that may be generated from pixel data captured by the capture device 104. The example images 340a-340n are shown in the correction test image set 306. Since the intrinsic matrix 192a may be applied, the example images 340a-340n may be corrected images. An image coordinate system 342 is shown on the image 340a. The image coordinate system 342 may have an origin point of (U0,V0) at a top left corner of the example image 340a. The origin point of the image coordinate system 342 may be varied according to the design criteria of a particular implementation (e.g., top left, top right, bottom left, bottom right, center, etc.).

The example image 340a may comprise a capture of the environment shown in the test pattern capture 302. The example image 340a may comprise a 2D target representation 344 of the correction target 320. Each of the example images 340a-340n may capture the correction target 320 in the FoV of the capture device 104. Each of the example images 340a-340n may capture the correction target 320 from a different angle and/or distance from the correction target 320. The correction test image set 306 may provide an illustrative example of the edge device 100i located at an origin location (e.g., X0,Y0,Z0). The test image 340a may show the 2D target representation 344 from a distance (e.g., DCA), the test image 340b may show the 2D target representation 344 from another distance (e.g., DCB), the test image 340c may show the 2D target representation 344 from yet another distance (e.g., DCC), the test image 340n may show the 2D target representation 344 from another distance (e.g., DCN), etc. In one example, the distance DCA may be 0.6 m, the distance DCB may be 1 m, the distance DCC may be 2 m and the distance DCN may be 3 m. Other distances may be used. The distances DCA-DCN for the test images 340a-340n may each represent a distance on the Z axis of the environment coordinate system 324. For example, the 2D target representation 344 may be at a different angle and/or distance in each of the example images 340a-340n. In the example image 340a, the 2D target representation 344 may capture a full view of the correction target 320 near a bottom right corner of the example image 340a.

The 2D target representation 344 may comprise intersection points 346aa-346nn (or corner points). The intersection points 346aa-346nn may comprise all of the intersection points of the checkerboard test pattern on the correction target 320. The intersection points 346aa-346nn are shown in a grid pattern at the intersection of the dark and light checkerboard squares on the correction target 320. The intersection points 346aa-346nn may be detected in the image using the computer vision operations to detect the intersection points 346aa-346nn as objects based on the characteristics of the test pattern of the correction target 320.

In the example shown, the intersection point 346nn may correspond to the real world intersection point 330 shown in the first view 310 and the second view 312. The intersection point 346nn may have an image coordinate value of (U,V). In one example, the image coordinate value may be a pixel location with respect to the origin point (U0,V0) such as (2011, 1677). The value for the intersection point 346nn that corresponds to the measured intersection point 330 (e.g., U1, V1) may be stored for one of the image mapping points 192b (e.g., the U and V entry for the IMAGE MAPPING POINT 1), which may be added to an entry of a collection of image mapping points 192b (e.g., the image coordinates may be added to the U,V entries in the mapping table TABLE 1). In one example, the correction target 320 may be at a distance of 1 m (e.g., 1000 mm) from the capture device 104, and the intersection point 346ii may be determined to be at the image coordinate value of (446,752), which may be measured (e.g., based on the measurement 332) as a world coordinate point of [−555,209](e.g., measured in millimeters). Since the origin point of the edge device 100i may be at the real world coordinate point of [0,0,0], the image mapping point entered into TABLE 1 may be X=−555, Y=209, Z=1000, U=446 and V=752.

Generally, once the exact position value of the image coordinate 346nn is known, then the positions of all the intersection points 346aa-346nn may be calculated for the image 304a. The image correction technique 300 may comprise an iteration of capturing one of the images 304a-304n, each capturing the correction target 320, detecting the intersection points 346aa-346nn in the image coordinate system (e.g., using computer vision operations), measuring the exact position of the intersection point 330 in the environment coordinate system, and then binding the data as one of the image mapping points 192b. The iteration may be repeated for each of the images 304a-304n to generate multiple mapping data sets for one of the edge devices 100a-100n.

Figure 7:
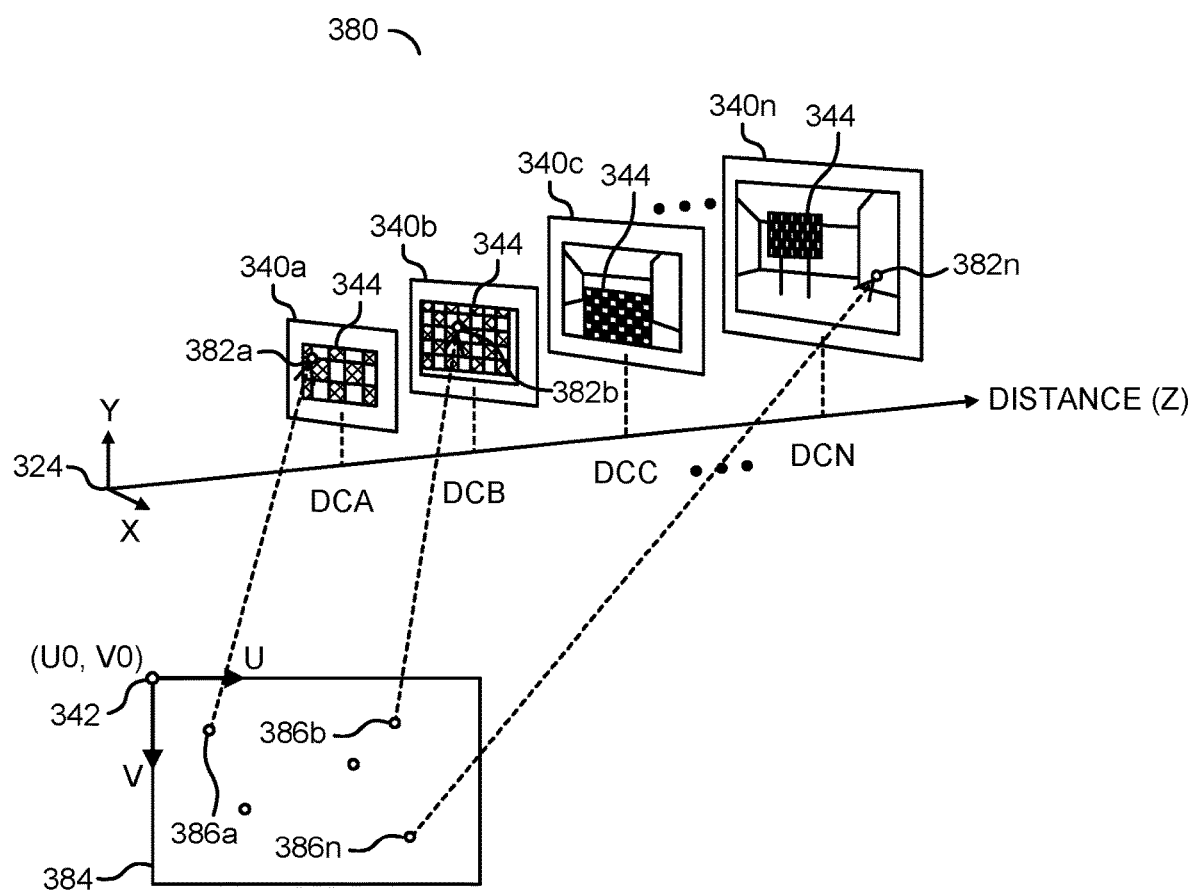
FIG. 7 is a diagram illustrating a projection of image coordinates to environment coordinates.

Referring to FIG. 7, a diagram illustrating a projection of image coordinates to environment coordinates is shown. A projection example 380 is shown. The projection example 380 may illustrate the test images 340a-340n on the environment coordinate system 324 similar to the correction test image set 306 shown in association with FIG. 6. The test images 340a-340n are shown at the respective distances DCA-DCN. Intersection points 382a-382n (e.g., corner points) are shown on the test images 340a-340n.

An example composite image 384 is shown. The image coordinate system 342 is shown on the composite image 384. The composite image 384 may comprise a collection of image coordinates 386a-386n. The collection of image coordinates 386a-386n may correspond with the intersection points 382a-382n from the test images 340a-340n. The collection of image coordinates 386a-386n are shown as a flat (e.g., 2D) representation of the intersection points 382a-382n. In the example shown, the image coordinate 386a may correspond with the intersection point 382a from the test image 340a, the image coordinate 386b may correspond with the intersection point 382b from the test image 340b and the image coordinate 386n may correspond with the intersection point 382n from the test image 340n.

Each of the test images 340a-340n may be located at the various distances DCA-DCN. The collection of image coordinates 386a-386n may correspond to the X and Y coordinates of the environment coordinate system 324, but may not provide a depth value (e.g., the Z coordinate). The processor 102 may be configured to solve the extrinsic matrix 192c to generate the image transfer function. The image transfer function may be used to translate a location on the image coordinate system 342 to a location in the environment coordinate system 324.

The extrinsic matrix 192c for the capture device 104 is shown as an equation (e.g., EQ1):

$$Z\begin{pmatrix}U\\V\\1\end{pmatrix}=K\left(R\begin{bmatrix}X\\Y\\Z\end{bmatrix}+tvec\right) \quad \text{(EQ1)}$$

The value K may be the intrinsic matrix 192a for the image sensor 180 (e.g., determined based on the image calibration technique 250). The value R may be a rotation matrix in the extrinsic matrix 192c. The value tvec may be a translation vector matrix in the extrinsic matrix 192c. The values U and V may be determined from the image coordinates. The values X, Y and Z may be determined when the extrinsic matrix 192c is solved. The extrinsic matrix 192c may be solved by determining the value for R and tvec. The values for R and tvec may be solved for based on the binding data generated from the image mapping points 192b. For example, based on a set of 3D points in a real world reference (e.g., the X,Y,Z environment coordinate entries from the binding data) and the corresponding 2D image projections (e.g., the U,V image coordinate entries from the binding data), the processor 102 may determine the 6 degree of freedom pose of the edge device 100i in the form of rotation and translation with respect to the environment. The result may be determined after the intrinsic matrix 192a is known. In one example, the extrinsic matrix 192c may be solved by performing a Perspective-n-Point (PnP) technique. In another example, the extrinsic matrix 192c may be solved by performing a Direct Linear Transform (DLT) technique. In yet another example, the extrinsic matrix 192c may be solved by performing a Random Sample Consensus (RANSAC) technique. The method of solving the extrinsic matrix 192c may be varied according to the design criteria of a particular implementation.

The processor 102 may be configured to project the image coordinates (e.g., U,V) to environment coordinates (e.g., X,Y,Z). To project the image coordinates from a 2D representation to a 3D representation the data from the images may be combined with depth data (e.g., the Z axis data) determined from the radar module 106.

Figure 8:
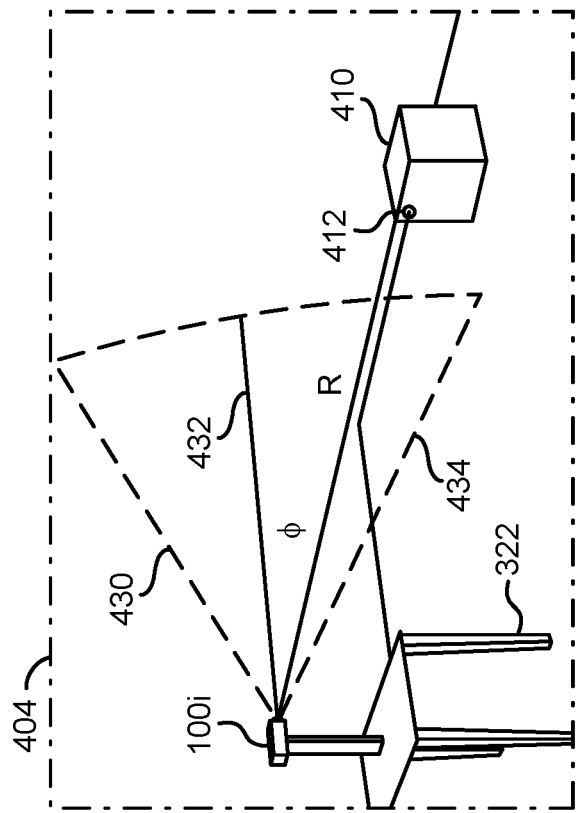
FIG. 8 is a diagram illustrating defining a valid area in response to the radar data of an object.
Figure 8:
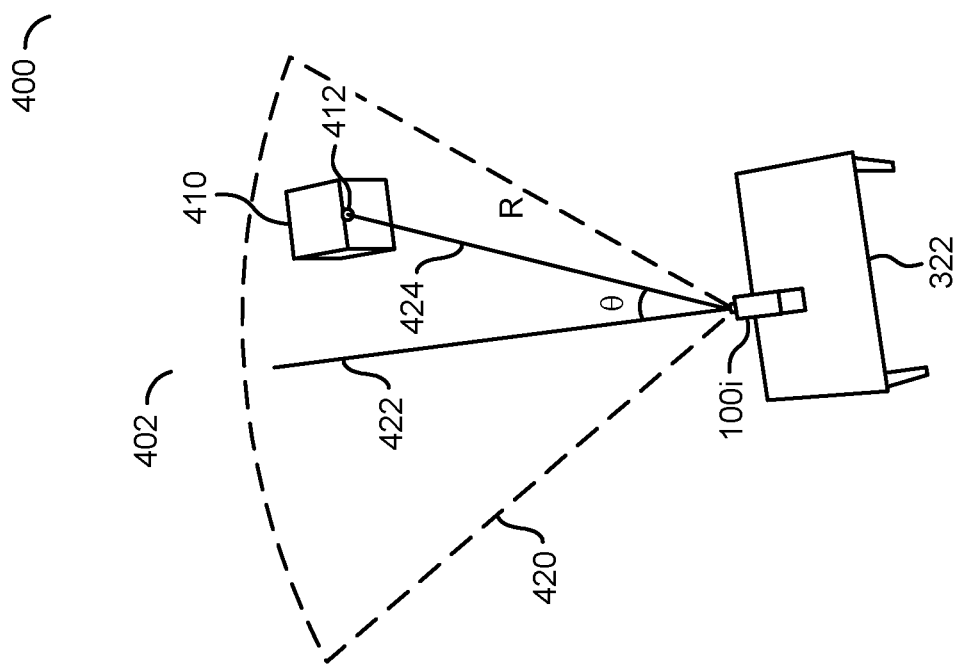

Referring to FIG. 8, a diagram illustrating defining a valid area in response to the radar data of an object is shown. An example radar capture 400 is shown. The example radar capture 400 may comprise a top down view 402 and a side view 404. The top down view 402 and the side view 404 may each comprise the edge device 100i standing on the table 322. The radar module 106 of the edge device 100i may capture radar data of an object 410. A location point 412 is shown on the object 410. The location point (e.g., x0,y0, z0) may provide a real-world coordinate of a central point of the object 410.

The processor 102 may be configured to define the valid area 194a and filter invalid data for the radar module 106. Defining the valid area 194a may be one type of correction for the radar data acquired. Defining the valid area 194a may comprise data processing and/or filtering. The processor 102 may be configured to select a data format for the radar data captured by the radar module 106. In some embodiments, the radar data may be captured in a format that provides coordinates in a spherical format comprising a range (R), a polar angle ($\Theta$) and an azimuth angle ($\varphi$). In some embodiments, the radar data may be captured in a format that provides coordinates in a Cartesian format providing X, Y, and Z environment coordinates. The radar data may further comprise a velocity, a Signal to Noise Ratio (SNR) value and/or strength value (e.g., object reflection strength). The invalid data may be filtered using one or more of the SNR value, the strength value, filtering a static point (e.g., velocity at zero) and/or filtering out a range of data (e.g., a range larger than the field of view of the radar lens). After filtering is performed, the selected data format may be used for further correction and/or calibration of the radar module 106.

In the example shown, the top down view 402 may comprise a polar field of view 420 of the radar module 106.

A center line 422 is shown extending from a center of the lens of the radar module 106. An object line 424 is shown from the edge device 100i to the center point 412 of the object 410. A polar angle value $\Theta$ is shown between the center line 422 and the object line 424. A range value R is shown as a distance from the radar module 106 to the object 410.

In the example shown, the side view 404 may comprise an azimuth field of view 430 of the radar module 106. A center line 432 is shown extending from a center of the lens of the radar module 106. An object line 434 is shown from the edge device 100i to the center point 412 of the object 410. An azimuth angle value $\varphi$ is shown between the center line 432 and the object line 434. A range value R is shown as a distance from the radar module 106 to the object 410.

The processor 102 may filter the radar data by range, the polar angle $\Theta$, the azimuth angle $\varphi$ and/or the SNR. In one example, data outside of the polar field of view 420 may be invalid data that may be filtered out. In another example, data outside of the azimuth field of view 430 may be invalid data that may be filtered out. The processor 102 may be configured to convert the spherical coordinates to the environment coordinate system 324.

Figure 9:
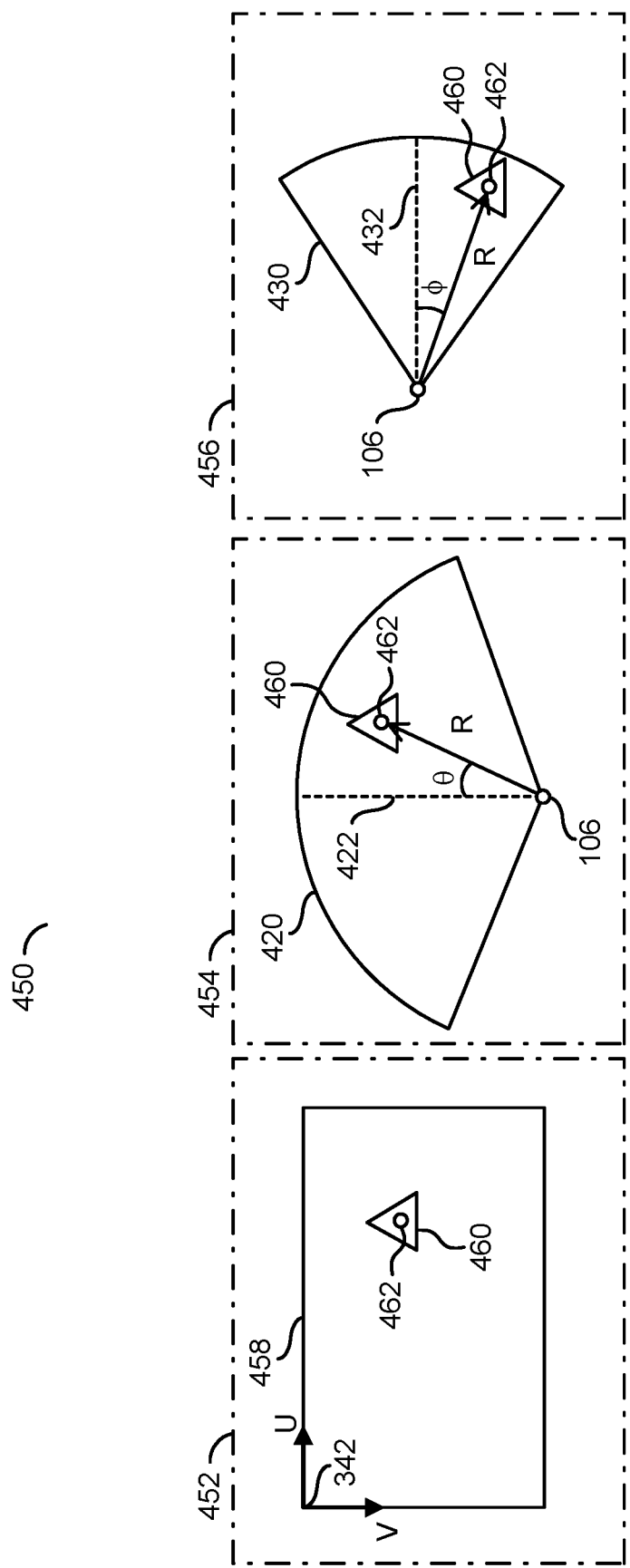
FIG. 9 is a diagram illustrating using a corner reflector to generate mapping points for image data and radar data.

Referring to FIG. 9, a diagram illustrating using a corner reflector to generate mapping points for image data and radar data is shown. A mapping example 450 is shown. The mapping example 450 may comprise an image capture 452, a top view of a radar capture 454 and a side view of the radar capture 456.

The processor 102 may be configured to map radar coordinates to the image coordinates. A corner reflector may be used as an object in order to aid in generating the radar mapping points 194b. For example, in the image coordinate system 342, a center coordinate of the corner reflector may be used as the radar mapping point. The corner reflector may comprise three mutually perpendicular, intersecting flat surfaces configured to reflect radar signals directly towards the source (e.g., the radar module 106).

The image capture 452 may comprise a radar test image 458. The radar test image 458 may comprise pixel data arranged as an image and/or video frame captured by the capture device 104 of the edge device 100i. The edge device 100i may be a representative example of each of the edge devices 100a-100n. For example, the radar calibration and/or correction may be performed for each of the edge devices 100a-100n.

The radar test image 458 may comprise the image coordinate system 342 as a reference. A corner reflector 460 is shown in the radar test image 458. In the example shown, the corner reflector 460 may be a triangular corner reflector. A reflector center point 462 is shown. The reflector center point 462 may be a central location of the corner reflector 460. The reflector center point 462 may be used to represent the location of the corner reflector 460 in the image coordinate system 342. In an example, the reflector center point 462 may have a value of (Uc,Vc). The processor 102 may be configured to detect the reflector center point 462 using the computer vision operations based on the characteristics of the corner reflector 460 (e.g., the object detected). The processor 102 may be configured to determine the location of the reflector center point 462 using computer vision operations (e.g., determining a number of pixels from the origin location of the image coordinate system 342).

The top view of a radar capture 454 may comprise the radar module 106, the polar FoV 420 and the center line 422. The corner reflector 460 is shown within the polar FoV 420. A line with length R is shown pointing to the reflector center point 462. A polar radius Θ is shown from the center line 422 to the reflector center point 462.

The side view of a radar capture 456 may comprise the radar module 106, the azimuth FoV 430 and the center line 432. The corner reflector 460 is shown within the azimuth FoV 430. The line with length R is shown pointing to the reflector center point 462. A azimuth radius φ is shown from the center line 432 to the reflector center point 462.

The distance value R, the polar radius Θ and the azimuth radius φ may be the radar data captured by the radar module 106 corresponding to the corner reflector 460. The image coordinates of reflector center point 462 may be used as part of the radar mapping points 194b with the radar data.

Figure 10:
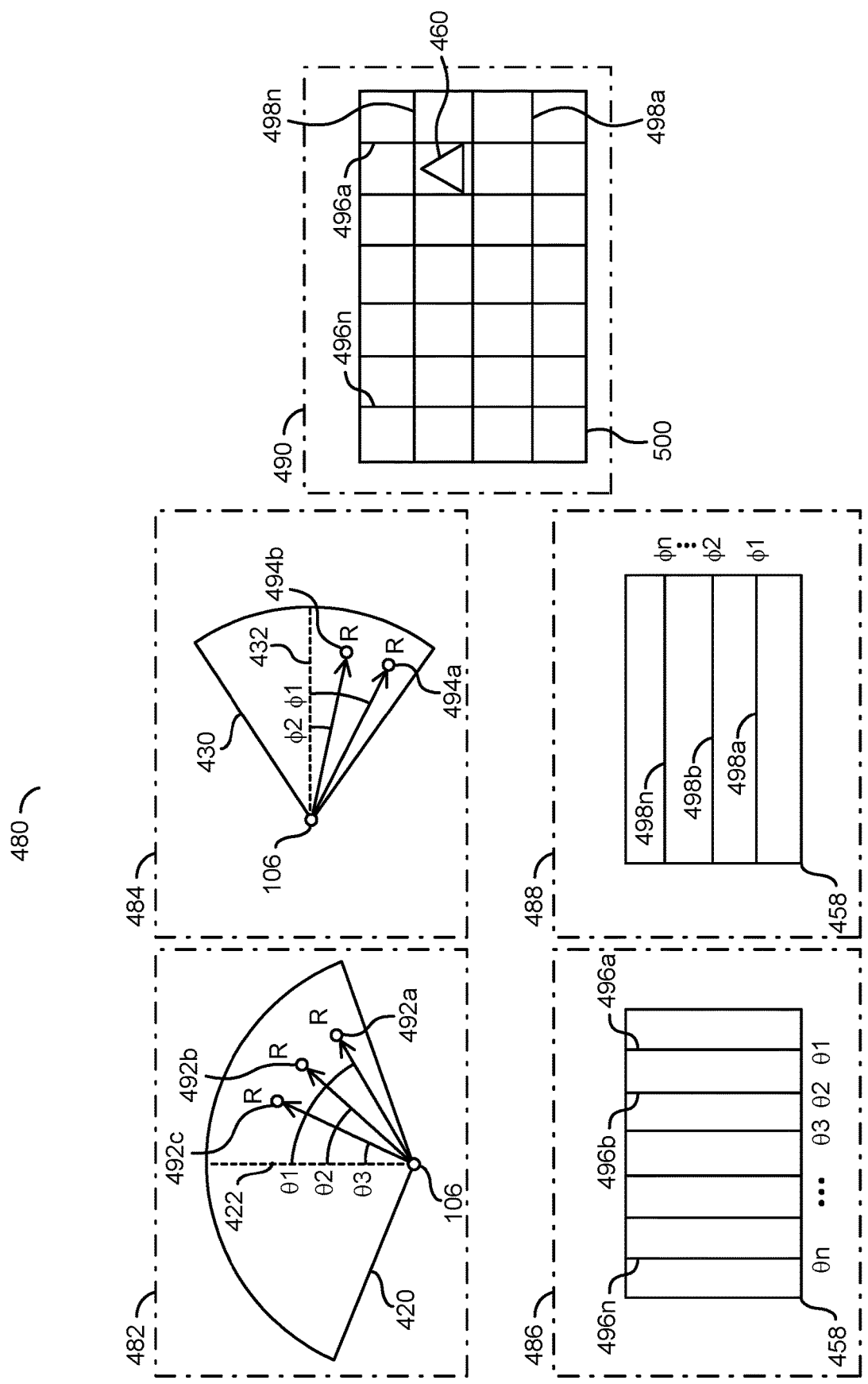
FIG. 10 is a diagram illustrating partitioning an image into blocks based on radar angles.

Referring to FIG. 10, a diagram illustrating partitioning an image into blocks based on radar angles is shown. An image partitioning technique 480 is shown. The image partitioning technique 480 may comprise a top down radar view 482, a side radar view 484, a polar image partitioning 486, an azimuth image partitioning 488 and/or a radar partitioned image 490. The image partitioning technique 480 may enable the images captured by the capture device 104 to be divided into several blocks by the polar radius Θ and the azimuth radius φ. Partitioning the image may be used to map radar data to the image coordinates.

The top down radar view 482 may comprise the radar module 106, the polar FoV 420 and the centerline 422. Object locations 492a-492c are shown within the polar FoV 420, each at the same distance R. The object location 492a may be at a polar angle Θ1 from the centerline 422, the object location 492b may be at a polar angle Θ2 from the centerline 422, and the object location 492c may be at a polar angle Θ3 from the centerline 422. For example, for calibration, an object may be placed at the distance R at known polar angles Θ1-Θ3. Additional polar angles to object locations at the same distance R may be measured to enable additional partitioning. For example, polar angle values Θ1-Θn may be obtained from the radar module 106.

The side radar view 484 may comprise the radar module 106, the azimuth FoV 430 and the centerline 432. Object locations 494a-494b are shown within the azimuth FoV 430, each at the same distance R. The object location 494a may be at an azimuth angle φ1 from the centerline 432, and the object location 494b may be at an azimuth angle φ2 from the centerline 432. For example, for calibration, an object may be placed at the distance R at known azimuth angles φ1-φ3. Additional azimuth angles to object locations at the same distance R may be measured to enable additional partitioning. For example, azimuth angle values φ1-φn may be obtained from the radar module 106.

The polar image partitioning 486 may comprise the image 458. The image 458 may comprise projected polar angles 496a-496n. Each of the projected polar angles 496a-496n may correspond to a respective one of the polar angle values Θ1-Θn captured by the radar module 106 for the distance R. The projected polar angles 496a-496n may comprise equally spaced vertical lines extending across the image 458. The processor 102 may be configured to project the polar angle values onto the 2D image. The number of polar angles Θ1-Θn captured may be determined based on the number (e.g., a resolution) of projected polar angle partitions desired on the image 458.

The azimuth image partitioning 488 may comprise the image 458. The image 458 may comprise projected azimuth angles 498a-498n. Each of the projected azimuth angles 498a-498n may correspond to a respective one of the azimuth angle values φ1-φn captured by the radar module 106 for the distance R. The projected azimuth angles 498a-498n may comprise equally spaced horizontal lines extending across the image 458. The processor 102 may be configured to project the azimuth angle values onto the 2D image. The number of azimuth angles φ1-φn captured may be determined based on the number (e.g., a resolution) of projected azimuth angle partitions desired on the image 458.

The radar partitioned image 490 may comprise a radar projected image 500. The radar projected image 500 may comprise both the projected polar angles 496a-496n and the projected azimuth angles 498a-498n. The projected polar angles 496a-496n and the projected azimuth angles 498a-498n may provide a grid pattern on the radar projected image 500 to provide a number of block locations. The corner reflector 460 is shown on the radar projected image 500. In the example shown, the corner reflector 460 may be located between the projected polar angles 496a-496b (e.g., between the polar angle Θ1 and the polar angle Θ2) and the projected azimuth angles 498b-468n (e.g., between the azimuth angle φ2 and the azimuth angle φn).

The processor 102 may use the projected polar angles 496a-496n and/or the projected azimuth angles 498a-498n to compare a region of interest of the object (e.g., the corner reflector 460) detected in the projected image 500 using computer vision operations and the region of interest of the object detected from the radar data to map radar data to the image coordinates. The radar data may provide the spherical coordinate data R,Θ,φ. The spherical coordinates, and the image coordinates of the corner reflector 460 (e.g., U,V pixel location of the reflector center point 462) may be used to generate the radar mapping points 194b. Different projected polar angles 496a-496n and different projected azimuth angles 498a-498n may be determined when the corner reflector 460 is set at different distances (e.g., the R value). The different radar data sets and image coordinates may be used as the radar mapping points 194b. Since the optical center of the image sensor 180 may not be located at the same location as the sensor center of the radar module 106, the capture device 104 and the radar module 106 may not be at the same point. For example, image partitioning may not be used directly to generate the radar mapping points 194b.

Figure 11:
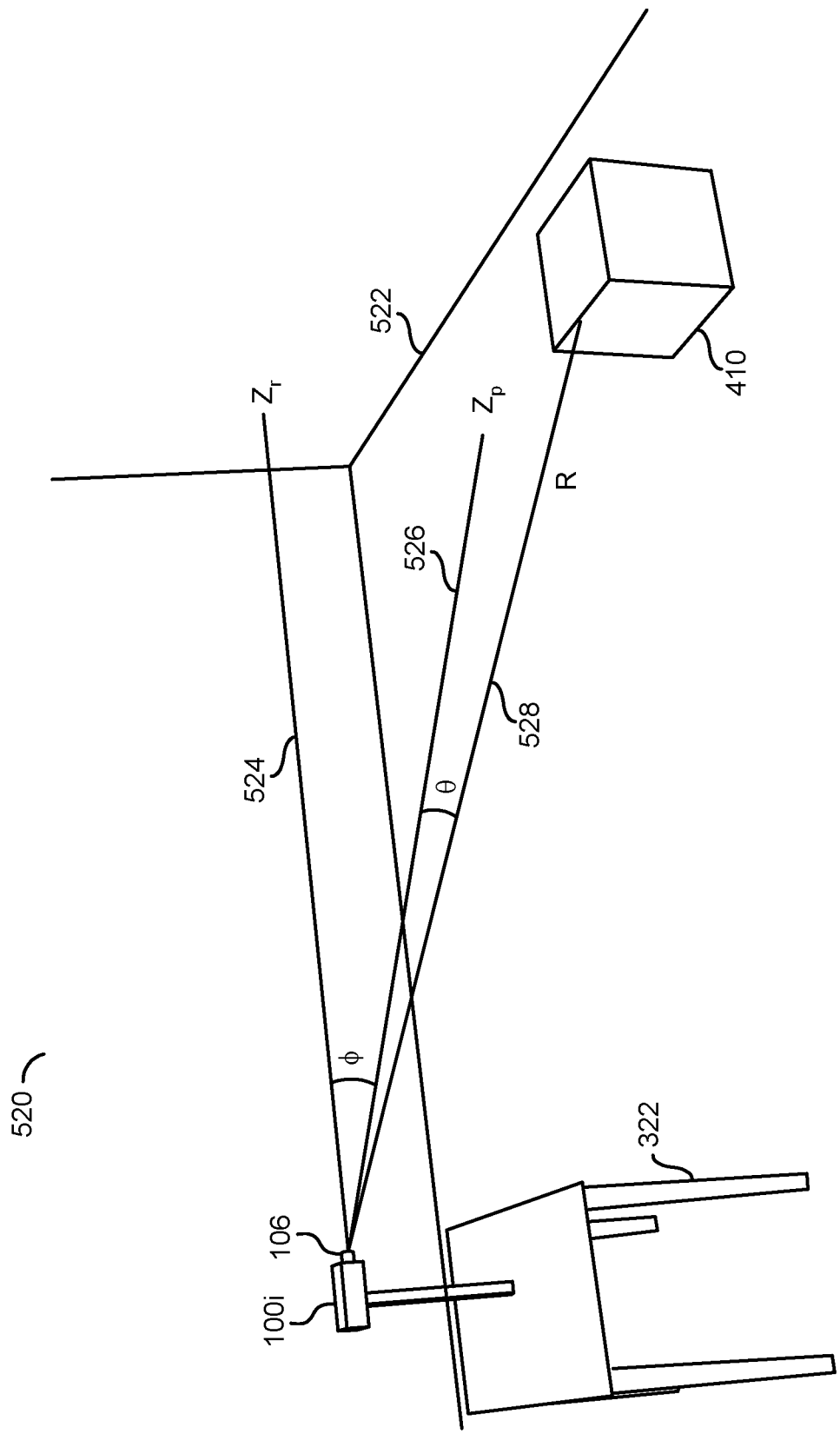
FIG. 11 is a diagram illustrating generating depth data from a radar sensor.

Referring to FIG. 11, a diagram illustrating generating depth data from a radar sensor is shown. The depth dimension value Z may be used by the processor 102 to project data point locations from the image coordinate system 342 to the environment coordinate system 324. The depth dimension value Z may be a value generated based on the radar data. An example radar data acquisition 520 is shown. The example radar data acquisition 520 may enable determining the depth dimension value Z. The depth dimension Z may be used to determine the extrinsic matrix 192c (as described in association with FIG. 7). For example, the extrinsic matrix 192c may be solved after determining the depth dimension data Z.

The example radar data acquisition 520 may comprise the edge device 100i mounted on the table 322. The radar module 106 of the edge device 100i is shown in an environment 522. The object 410 is shown. The horizontal direction of edge device 100i may be assumed to be the X-axis, the vertical direction of the edge device 100i may be assumed to be the Y-axis and the depth direction of the edge device 100i may be assumed to be the Z-axis. A line 524, a line 526 and a line 528 are shown extending from the radar module 106. The line 524 may be the depth axis, the line 526 may be a Zp line and the line 528 may be the distance R from the radar module 106 to the object 410. A value Zr is shown at the end of the line 524. A value Zp is shown at the end of the line 526.

The depth value Z may be determined based on the value Zr and the value Zp according to a number of equations (e.g., EQ2, EQ3 and EQ4):

$$Z_r = Z_p \times \cos\left(\frac{\phi}{180}\pi\right) \quad (EQ2)$$

$$Z_p = R \times \cos\left(\frac{\theta}{180}\pi\right) \quad (EQ3)$$

$$Z = R \times \cos\left(\frac{\theta}{180}\pi\right) \times \cos\left(\frac{\phi}{180}\pi\right) \quad (EQ4)$$

The polar angle value Θ, the azimuth angle value φ and the distance value R may be determined from the radar data. The radar data may comprise the polar angle value Θ, the azimuth angle value φ and the distance value R when the polar coordinates are selected for capturing the radar data. The depth value Z may be used by the processor 102 for mapping points in the image coordinates 342 to the environment coordinates 324 using the extrinsic matrix 192c.

Figure 12:
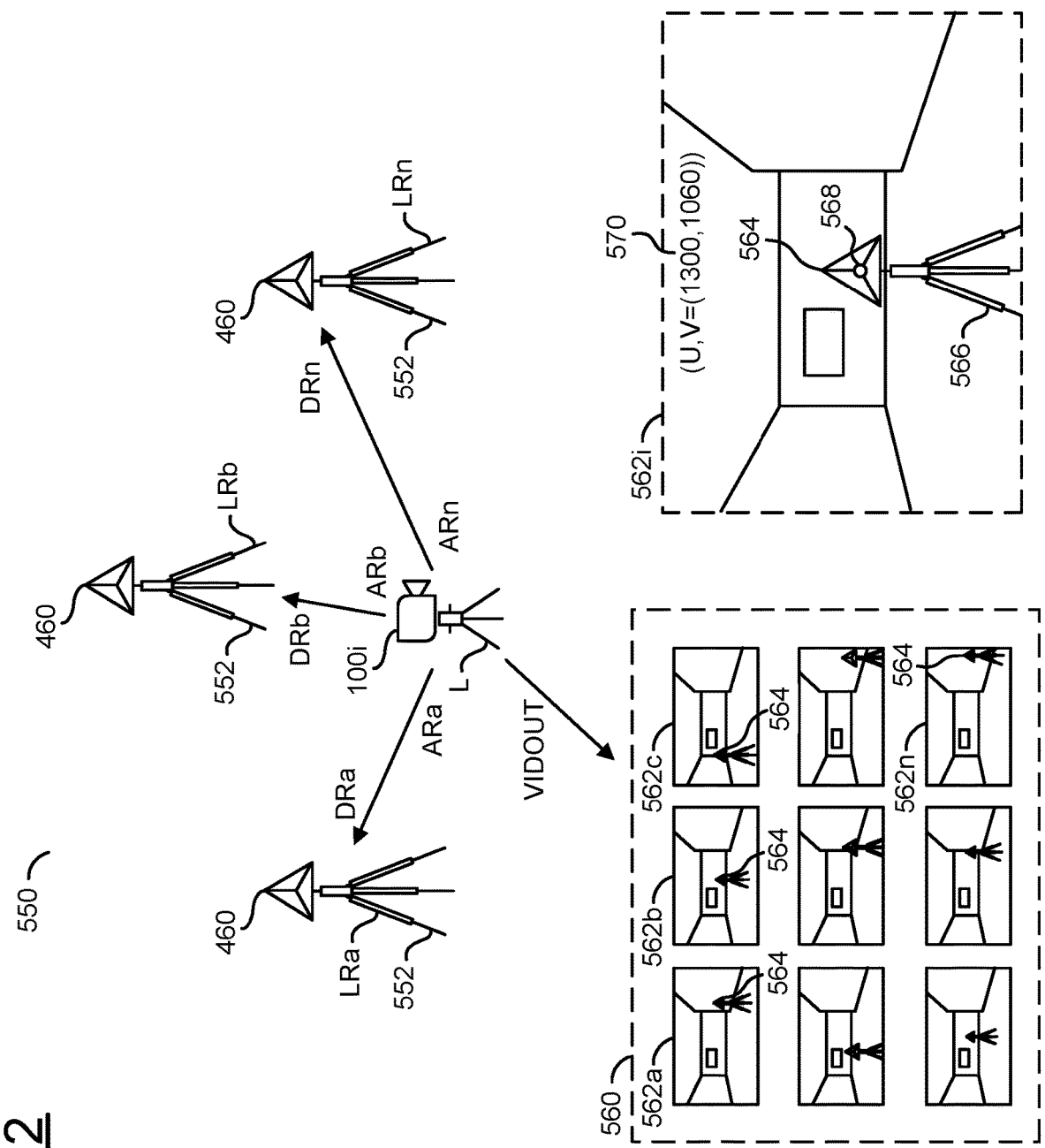
FIG. 12 is a diagram illustrating generating radar mapping points in response to an environment for a radar device using a radar correction method.

Referring to FIG. 12, a diagram illustrating generating radar mapping points in response to an environment for a radar device using a radar correction method is shown. A radar correction technique 550 is shown. In some embodiments, the radar module 106 may capture the radar data in the polar coordinate format (e.g., R, Θ, φ). In some embodiments, the radar module 106 may be configured to capture the radar data in the environment coordinate system 324 (e.g., X, Y, Z). The format for the radar data may be selected according to a user preference (e.g., based on the input USER) and/or hardware limitations of the edge devices 100a-100n. Since the optical center of the image sensor 180 may not be located at the same location as the sensor center of the radar module 106, the capture device 104 and the radar module 106 may not be at the same point. For example, image partitioning may not be used directly to generate the radar mapping points 194b, regardless of whether the radar module 106 has been set to use the polar coordinate format or the environment coordinate system 324.

The radar correction technique 550 may be implemented to bind a center coordinate of the corner reflector 460 in the image coordinate system 342 as a mapping point for the radar coordinates. In an example, the radar module 106 may be configured to provide the radar data in a format with the environment coordinate system 324 (e.g., a first radar data set comprising range=102 cm, v=+12, x=+5, y=−7, z=+101, power=363, a second data set comprising range=102 cm, v=+12,x=+19, y=−22, z=+100, power=112, etc.). The radar data may be directly entered as a portion of one of the radar mapping points 194b in a table (e.g., TABLE 2). The radar correction technique 550 may enable capturing a set of images for generating radar mapping points 194b from the image data and the radar data. TABLE 2:

| Calibration Data | X | Y | Z | U | V |
|---|---|---|---|---|---|
| Radar Mapping Point 1 | | | | | |
| Radar Mapping Point 2 | | | | | |
| ... | | | | | |
| Radar Mapping Point 3 | | | | | |

The radar correction technique 550 may comprise the edge device 100i, the corner reflector 460 and a stand 552. The corner reflector 460 may be mounted on the stand 552. The edge device 100i is shown performing the radar correction technique 550. The edge device 100i performing the radar correction technique 550 is shown as a representative example of performing the radar correction technique 550 for each of the edge devices 100a-100n. The edge device 100i is shown at one location (e.g., L) and the corner reflector 460 is shown at various locations (e.g., LRa-LRn) illustrating that the corner reflector 460 may be moved to multiple different locations during the radar correction technique 550. The locations LRa-LRn may each be at a particular angle and distance from the corner reflector 460 to the edge device 100i. The locations LRa-LRn may be at the same or different locations as the locations La-Ln used for the lens calibration technique 250. In one example, the location LRa may be a distance DRa and an angle ARa with respect to the corner reflector 460 and the edge device 100i, the location LRb may be a distance DRb and an angle ARb with respect to the corner reflector 460 and the edge device 100i, the location LRn may be a distance DRn and an angle ARn with respect to the corner reflector 460 and the edge device 100i, etc. In one example, the distance DRa may be approximately 1 m, the distance DRb may be approximately 2 m and the distance DRn may be approximately 3 m away from the corner reflector 460. The capture device 104 may be configured to capture one or more images of the corner reflector 460 at each of the locations LRa-LRn. For example, a person may manually place the edge device 100i at the location L, take a number of images of the corner reflector 460 at the location LRa, move the corner reflector 460 to the location LRb, take a number of images of the corner reflector 460, etc. In the example shown, the edge device 100i may be stationary (e.g., at the location L) and the corner reflector 460 may be manually moved to the locations LRa-LRn to capture the images at different distances and angles. In another example, the corner reflector 460 may remain stationary and the edge device 100i may be manually moved to capture the images at different distances and angles (e.g., similar to the example shown in association with FIG. 5 for the lens calibration technique 250). The edge device 100i is shown generating the signal VIDOUT.

A block 560 is shown. The signal VIDOUT from the edge device 100i is shown directed to the block 560. The block 560 may comprise radar correction test images. The radar correction test images 560 may comprise reflector images 562a-562n. Each of the reflector images 562a-562n may comprise an image and/or video frame that captures the corner reflector 460. Since the intrinsic matrix 192a may be applied, the reflector images 562a-562n may be corrected images. A 2D corner reflector representation 564 is shown in each of the reflector images 562a-562n. Each of the reflector images 562a-562n may comprise pixel data and/or images captured for a particular one of the locations LRa-LRn. For example, the reflector image 562a may comprise an image captured for the location LRa comprising a view of the corner reflector 460 from a distance DRa and angle ARa. In another example, the reflector image 562b may comprise an image captured for the location LRb comprising a view of the corner reflector 460 from a distance DRb and angle ARb. While one of the reflector images 562a-562n is shown representing an image captured for the respective locations LRa-LRn, the capture device 104 may capture multiple images (e.g., a reflector image set) for each of the locations LRa-LRn.

The reflector image 562i is shown as a larger representation of the reflector images 562a-562n. The reflector image 562i may comprise the 2D corner reflector representation 564 of the corner reflector 460 and a 2D stand representation 566 of the stand 552. A dot 568 is shown. The dot 568 may represent a pixel (or pixel cluster) location of the reflector center point 462. The processor 102 may be configured to perform the computer vision operations on each of the reflector images 562a-562n to detect objects that have the characteristics of the corner reflector 460. Based on the characteristics of the corner reflector 460, the processor 102 may detect the pixel location 568 of the reflector center point 462.

A location value 570 is shown on the reflector image 562i. The location value 570 may represent the pixel (or pixel cluster) location 568. The processor 102 may determine the pixel location 568 of the reflector center point 462 using the computer vision operations and generate the location value 570. In the example shown, the location value 570 is overlaid on the reflector image 562i (e.g., a visual indicator for a debug mode of operation). In one example, the location value 570 may be added to the metadata of the reflector images 562a-562m. In another example, the location value 570 may be stored in the memory 150. The location value 570 may comprise a U,V coordinate value for the reflector center point 462 in the image coordinate system 342. In the example shown, the U,V value may be 1300,1060. The U,V coordinate of the location value 570 may be stored as the U,V value in TABLE 2 as the image coordinate data for one of the radar mapping points 194b.

The radar correction technique 550 may be performed after the intrinsic matrix 192a has been determined for the capture device 104 (e.g., after performing the lens calibration technique 250) and after defining the valid area 194a for the radar module 106. The radar correction technique 550 may comprise capturing the reflector images 562a-562n and determining the location value 570 for each of the reflector images 562a-562n (U,V values for TABLE 2) and detecting the corner reflector 460 with the radar data (e.g., the X,Y,Z values for TABLE 2). The combination of the U,V,X,Y, and Z data may be used as one of the radar mapping points 194b. The radar data paired with each of the reflector images 562a-562n may be the binding data for the radar mapping points 194b.

Figure 13:
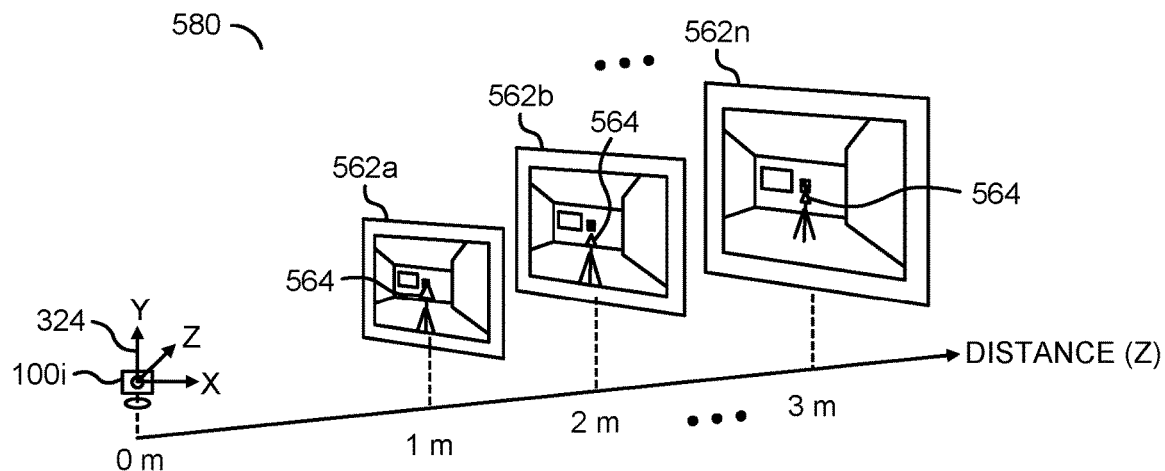
FIG. 13 is a diagram illustrating a Perspective-n-Point technique for transferring radar coordinates to image coordinates.

Referring to FIG. 13, a diagram illustrating a Perspective-n-Point technique for transferring radar coordinates to image coordinates is shown. An example of the Perspective-n-Point (PnP) technique 580 is shown. Generally, a suitable technique may be selected to determine the radar mapping function 194c. The technique used may be selected based on the data accuracy of the radar mapping points 194b generated. In one example, the PnP technique 580 may be selected when the data accuracy is relatively high and/or when vertical information (e.g., p) is available. The example PnP technique 580 may comprise the edge device 100i, the environment coordinate system 324, and the reflector images 562a-562n. The reflector images 562a-562n may each capture the 2D reflector representation 564 of the corner reflector 460 at varying distances (e.g., the Z axis of the environment coordinate system 324) with the edge device 100i located at the real world coordinate (0,0,0).

In one example, using the radar mapping data from TABLE 2, the radar data (e.g., X,Y,Z coordinates) and the location value 570 (e.g., the U,V coordinates) the radar transformation function (e.g., the radar mapping function 194c) may be determined. In another example, using the radar mapping data 194b comprising the spherical coordinate data format and the location values 570, the radar mapping function 194c may be determined. The radar transformation function may enable a transformation of the radar coordinates to image coordinates. The depth data may enable the image transformation matrix 192c to transform the image coordinate system 342 to the environment coordinate system 324. The transformation data (e.g., the radar transformation function 194c and the image transformation data 192c) may be used by the processor 102 at runtime to compare objects detected by the radar system and objects detected using computer vision operations to be compared on an aligned coordinate system.

Figure 14:
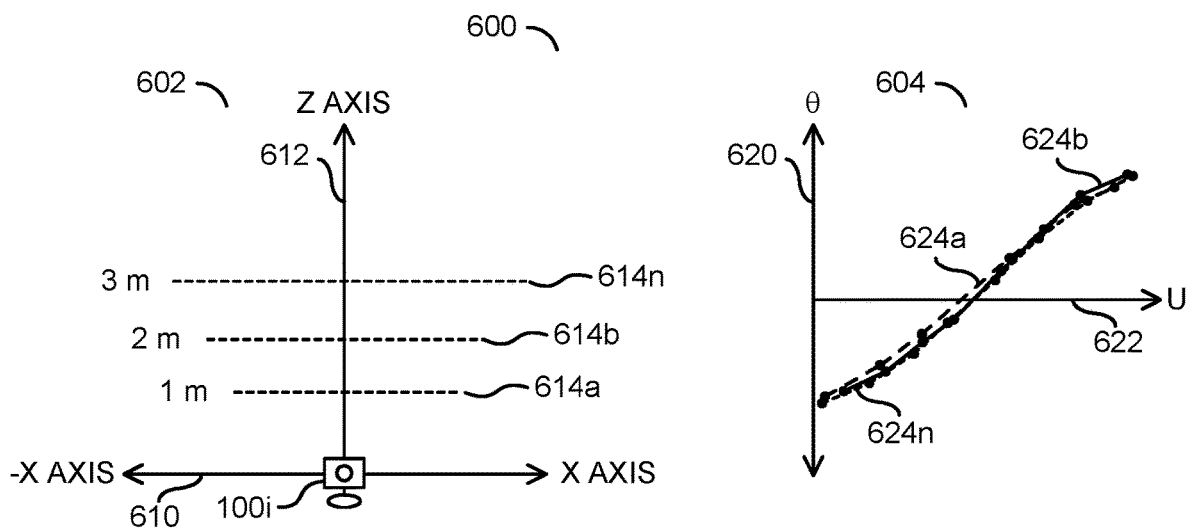
FIG. 14 is a diagram illustrating a linear regression technique for transferring radar coordinates to image coordinates.

Referring to FIG. 14, a diagram illustrating a linear regression technique for transferring radar coordinates to image coordinates is shown. An example of a regression technique 600 is shown. In some embodiments, the regression technique 600 may comprise a polynomial regression technique. In some embodiments, the regression technique 600 may comprise a linear regression technique. Generally, a suitable technique may be selected to determine the radar mapping function 194c. The technique used may be selected based on the data accuracy and/or format of the radar mapping points 194b generated. In one example, a linear regression technique may be selected when the data accuracy is relatively low and/or when vertical information (e.g., φ) is not available. In another example, if accuracy is desired then a polynomial regression technique may be selected. The particular regression technique implemented may be varied according to the design criteria of a particular implementation.

The regression technique 600 may comprise a graph 602 and a graph 604. The graph 602 may comprise an axis 610 and an axis 612. The axis 610 may be an X axis of the environment coordinates 324 and the axis 612 may be a Z axis of the environment coordinates 324. The edge device 100i is shown at the origin of the x-axis 610 and the z-axis 612. Horizontal dashed lines 614a-614n are shown. The horizontal dashed lines 614a-614n may represent distance values (e.g., Z values) of the reflector images 562a-562n captured. In the example shown, the distance value 614a may correspond to 1 m, the distance value 614b may correspond to 2 m and the distance value 614n may correspond to 3 m.

The graph 602 may comprise an axis 620 and an axis 622. The axis 620 may be a Θ axis and the axis 622 may be a U axis. In one example, the Θ axis 620 may be from −45 degrees to 45 degrees and the U axis may be from 0 to 3840 (e.g., for an image with a resolution of 3840×2160). In some embodiments, if the radar module 106 provides X,Y,Z data, then the value on the axis 622 may correspond to the X radar data values. Lines 624a-624n are shown. The line 624a may represent the image corresponding to a 1 m distance, the line 624b may represent the image corresponding to a distance of 2 m and the line 624n may represent the image corresponding to a distance of 3 m.

The regression technique 600 may enable the determination of the radar transformation function based on the relationship between the values in TABLE 2 (e.g., the radar mapping points 194b). The radar transformation function 194c may enable a transformation of the radar coordinates to image coordinates. The depth data may enable the image transformation matrix 192c to transform the image coordinate system 342 to the environment coordinate system 324. The transformation data (e.g., the radar transformation function 194c and the image transformation data 192c) may be used by the processor 102 at runtime to compare objects detected by the radar system and objects detected using computer vision operations to be compared on an aligned coordinate system.

Figure 15:
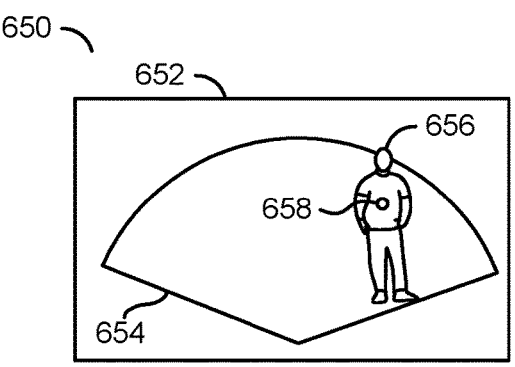
FIG. 15 is a diagram illustrating an example of mapping a radar coordinate to an image coordinate.

Referring to FIG. 15, a diagram illustrating an example of mapping a radar coordinate to an image coordinate is shown. An example mapping 650 is shown. Using the transformation data (e.g., the image transformation matrix 192c and the radar mapping function 194c), the radar data and the region of interest from the computer vision operations may be mapped to a common (e.g., aligned) basis.

The example mapping 650 may comprise an image 652 and an example radar FoV 654. A person (e.g., an object) 656 is shown detected in both the image 652 (e.g., captured by the capture device 104 and detected by the processor 102 using the computer vision operations) and the radar FoV 654 (e.g., captured by the radar module 106 and detected by the processor 102 using the radar processing operations).

The processor 102 may be configured to transform the radar data to the image coordinates. Transforming the radar data to the image coordinates may be performed using the radar transformation function 194c. The radar transformation function 194c may be generated based on the mapping function determined (e.g., as shown in association with FIGS. 8-15). The processor 102 may be configured to transform the image coordinates to real-world coordinates using the image transformation data. The image transformation data may be generated based on the extrinsic matrix 192c (e.g., as shown in association with FIGS. 5-7).

An object location 658 is shown on the person 656. The object location 658 may be used to map the person 656 to the real world coordinates. Mapping the person 656 to the real world coordinates may enable determining various information about the person 656 (e.g., liveness, location, height, velocity, etc.).

In some embodiments, the processor 102 may generate the transformation data (e.g., the extrinsic matrix 192c and the radar mapping function 194c) and the transformation data may be presented to an external device to perform analysis of the image data and the radar data. In some embodiments, the processor 102 may generate the transformation data and the processor 102 may use the transformation data internally to perform analysis of the image data and the radar data during runtime.

Figure 16:
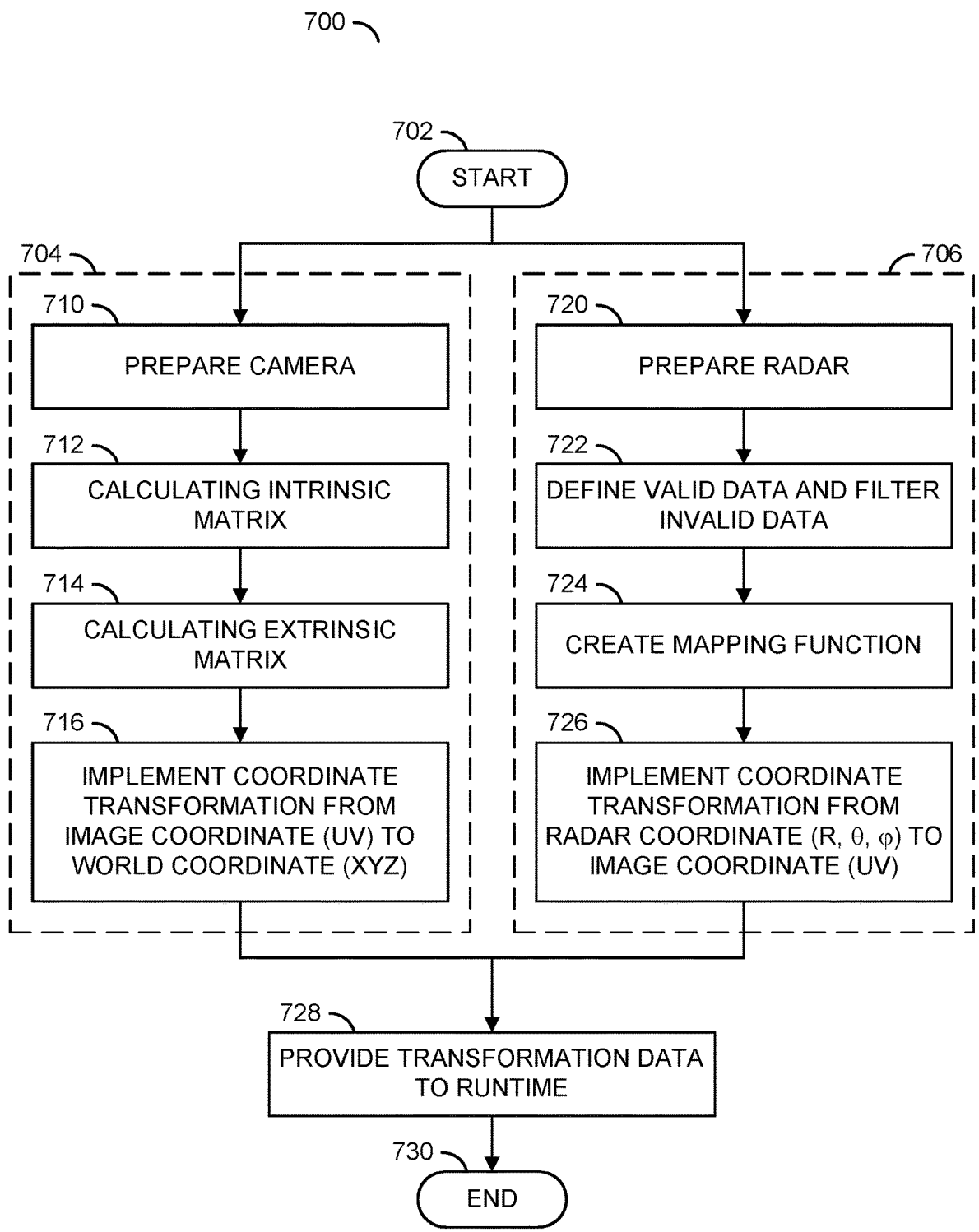
FIG. 16 is a flow diagram illustrating a method for calibrating a single lens camera and a radar for fusing objects detected by radar with objects captured by a single lens camera.

Referring to FIG. 16, a method (or process) 700 is shown. The method 700 may calibrate a single lens camera and a radar for fusing objects detected by radar with objects captured by a single lens camera. The method 700 generally comprises a step (or state) 702, a stage (or sub-routine) 704, a stage (or sub-routine) 706, a step (or state) 710, a step (or state) 712, a step (or state) 714, a step (or state) 716, a step (or state) 720, a step (or state) 722, a step (or state) 724, a step (or state) 726, a step (or state) 728, and a step (or state) 730.

The step 702 may start the method 700. Next, the method 700 may move to the stage 704 and/or the stage 706. The stage 704 may be a camera correction and calibration stage. The stage 706 may be a radar correction stage. For illustrative purposes, the camera correction and calibration stage 704 may be shown being performed in parallel with the radar correction stage 706. In some embodiments, the camera correction and calibration stage 704 may be performed in parallel and/or substantially in parallel with the radar correction stage 706. In some embodiments, the some of the steps of the radar correction stage 706 may not be performed until after particular steps of the camera correction and calibration stage 704. For example, there may be data interdependencies between various steps in the camera correction and calibration stage 704 and the radar correction stage 706. For example, the intrinsic matrix 192a may generally be determined first, and the extrinsic matrix 192c may be determined after determining the radar depth data Z.

The step 710 may start the camera correction and calibration stage 704. In the step 710, the capture device 104 may be prepared and/or initialized. For example, a person (e.g., an engineer, a technician, a product tester, etc.) may set up the lens calibration technique 250 and/or the image correction technique 300. Next, in the step 712, the processor 102 may calculate the intrinsic matrix 192a for the capture device 104 of one of the edge devices 100a-100n. For example, the intrinsic matrix 192a may be determined using the lens calibration technique 250 as shown in association with FIG. 5 (e.g., the Zhang Zhengyou Calibration technique and/or another calibration technique). In the step 714, the processor 102 may calculate the extrinsic matrix 192c. For example, the step 714 may rely on depth data from the radar module 106 to determine the extrinsic matrix 192c using the PnP technique. In one example, the image mapping points 194b may be generated using the lens correction technique 300, as shown in association with FIG. 6, to calculate the extrinsic matrix 192c. Next, in the step 716, the processor 102 may use the extrinsic matrix 192c to implement a coordinate transformation from an image coordinate (e.g., U,V) to a real world coordinate (e.g., X,Y,Z). The camera correction and calibration stage 704 may end at the step 716. Next, the method 700 may move to the step 728.

The step 720 may start the radar correction stage 706. In the step 720, the radar module 106 may be prepared and/or initialized. For example, a person (e.g., an engineer, a technician, a product tester, etc.) may select a radar data format. Next, in the step 722, the processor 102 may define valid data and/or filter invalid data as shown in association with FIG. 8. In the step 724, the processor 102 may create the radar mapping function 194c. For example, if spherical radar data is selected for the radar module 106, the radar partitioned image 490 may be used for the radar mapping points 194b. In another example, if Cartesian radar data is selected for the radar module 106, the radar correction technique 550 may be used for the radar mapping points 194b. Next, in the step 726, the processor 102 may implement a coordinate transformation from the radar coordinates to the image coordinates. In one example, the PnP technique 580 may be used to generate the radar mapping function 194c. In another example, the regression technique 600 may be used to generate the radar mapping function 194c. The radar correction stage 706 may end at the step 726. Next, the method 700 may move to the step 728.

In the step 728, the image coordinate transformation and/or the radar coordinate transformation may be provided for the processor 102 to be used at runtime. For example, the image coordinate transformation may comprise the extrinsic matrix 192c. For example, the radar coordinate transformation may comprise the radar mapping function 194c. The extrinsic matrix 192c and/or the radar mapping function 194c may be used by the processor 102 to transform image data and/or radar data to an aligned coordinate system in order to compare the radar data to the image data (e.g., determine whether the radar data detection intersects with the location of the results of the computer vision operations). The intrinsic matrix 192a, the image mapping points 192b, the extrinsic matrix 192c, the valid area 194a, the radar mapping points 194b, and the radar mapping function 194c may be used to calibrate the capture device 104 and the radar module 106 for fusing objects detected by the radar module 106 with objects captured by the capture device 104. The extrinsic matrix 192c and the radar mapping function 194c may be used to align a region of interest from the radar data to a region of interest from a computer vision result. Next, the method 700 may move to the step 730. The step 730 may end the method 700.

Figure 17:
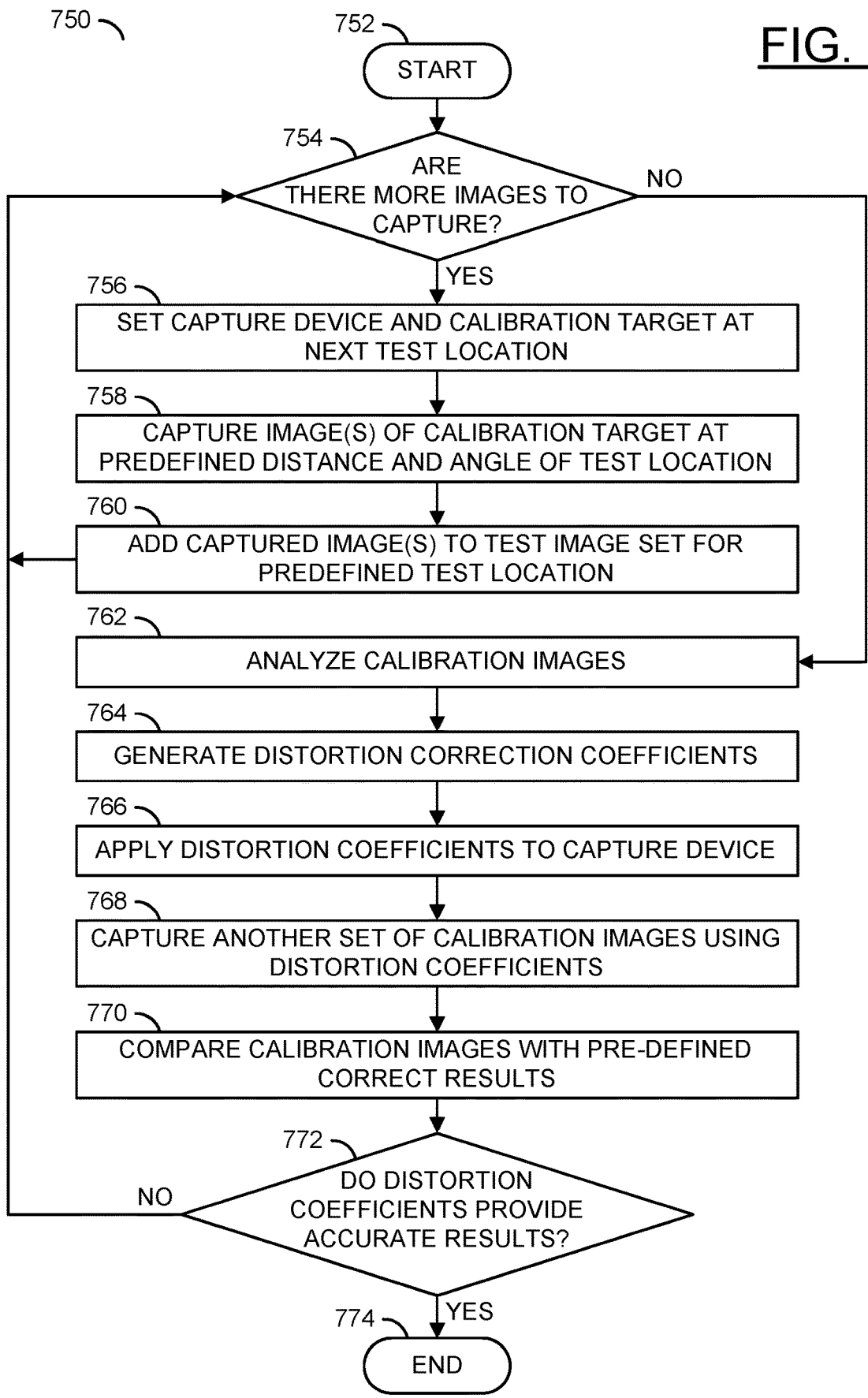
FIG. 17 is a flow diagram illustrating a method for determining an intrinsic matrix for a capture device.

Referring to FIG. 17, a method (or process) 750 is shown. The method 750 may determine an intrinsic matrix for a capture device. The method 750 generally comprises a step (or state) 752, a decision step (or state) 754, a step (or state) 756, a step (or state) 758, a step (or state) 760, a step (or state) 762, a step (or state) 764, a step (or state) 766, a step (or state) 768, a step (or state) 770, a decision step (or state) 772, and a step (or state) 774.

The step 752 may start the method 750. In the decision step 754, the processor 102 may determine whether there are more images to capture. In one example, the processor 102 may compare the number of calibration test images 260 acquired to a number of images used to perform for the lens calibration technique 250 (e.g., based on the number of different angles and/or distances to capture the calibration target 252). In another example, a person (e.g., an engineer, a technician, a product tester, etc.) may decide when a sufficient number of images have been captured. If there are more images to capture, then the method 700 may move to the step 756.

In the step 756, the capture device 104 and/or the calibration target 252 may be set at a next test location. For example, the edge devices 100a-100n may be set at one of the test locations La-Ln. Next, in the step 758, the capture device 104 may capture one or more of the video frames 264a-264n at the predefined distance (e.g., one of the distances Da-Dn) and angles (e.g., Aa-An) of the test location. In the step 760, the processor 102 may add the captured video frames 264a-264n of the calibration target 252 to one of the respective calibration test image sets 262a-262n associated with one of the test locations La-Ln. In one example, the calibration test image sets 262a-262n may be stored in the memory 150. In another example, the calibration test image sets 262a-262n may be communicated to the processing device 270. Next, the method 750 may return to the decision step 754.

In the decision step 754, if there are no more images to capture (e.g., the calibration test image sets 262a-262n for each of the locations La-Ln have all been captured), then the method 750 may move to the step 762. In the step 762, the processor 102 and/or the processing device 270 may analyze the calibration images 264a-264n. Next, in the step 764, the processor 102 and/or the processing device 270 may generate distortion correction coefficients. The distortion correction coefficients may be a dewarp table that may be used as the intrinsic matrix 192a. In the step 766, the coefficients may be applied to the capture device 104. In one example, the processor 102 may load the intrinsic matrix 192a. In another example, the processor 102 may receive the intrinsic matrix 192a from the processing device 270. Next, in the step 768, the capture device 104 may capture another set of the calibration images 260 using the distortion coefficients. In the step 770, the calibration images 260 may be compared with pre-defined correct results (e.g., reference images and/or known accurate values for the dot pattern 254aa-254nn). In one example, the memory 150 may store the reference images/values. In another example, the processing device 270 may store the reference images/values. Next, the method 750 may move to the decision step 772.

In the decision step 772, the processor 102 may determine whether the distortion coefficients provide accurate results. For example, the accurate results may produce images without distortion and/or appear similar to the reference images (e.g., provide the rectilinear lines 288). If the intrinsic matrix 192a does not provide accurate results, then the method 750 may return to the decision step 754 to capture more calibration images 260 and generate updated distortion coefficients. If the intrinsic matrix 192a does provide accurate results, then the intrinsic matrix 192a may continue to be used by the capture device 104 and the method 750 may move to the step 774. The step 774 may end the method 750.

Figure 18:
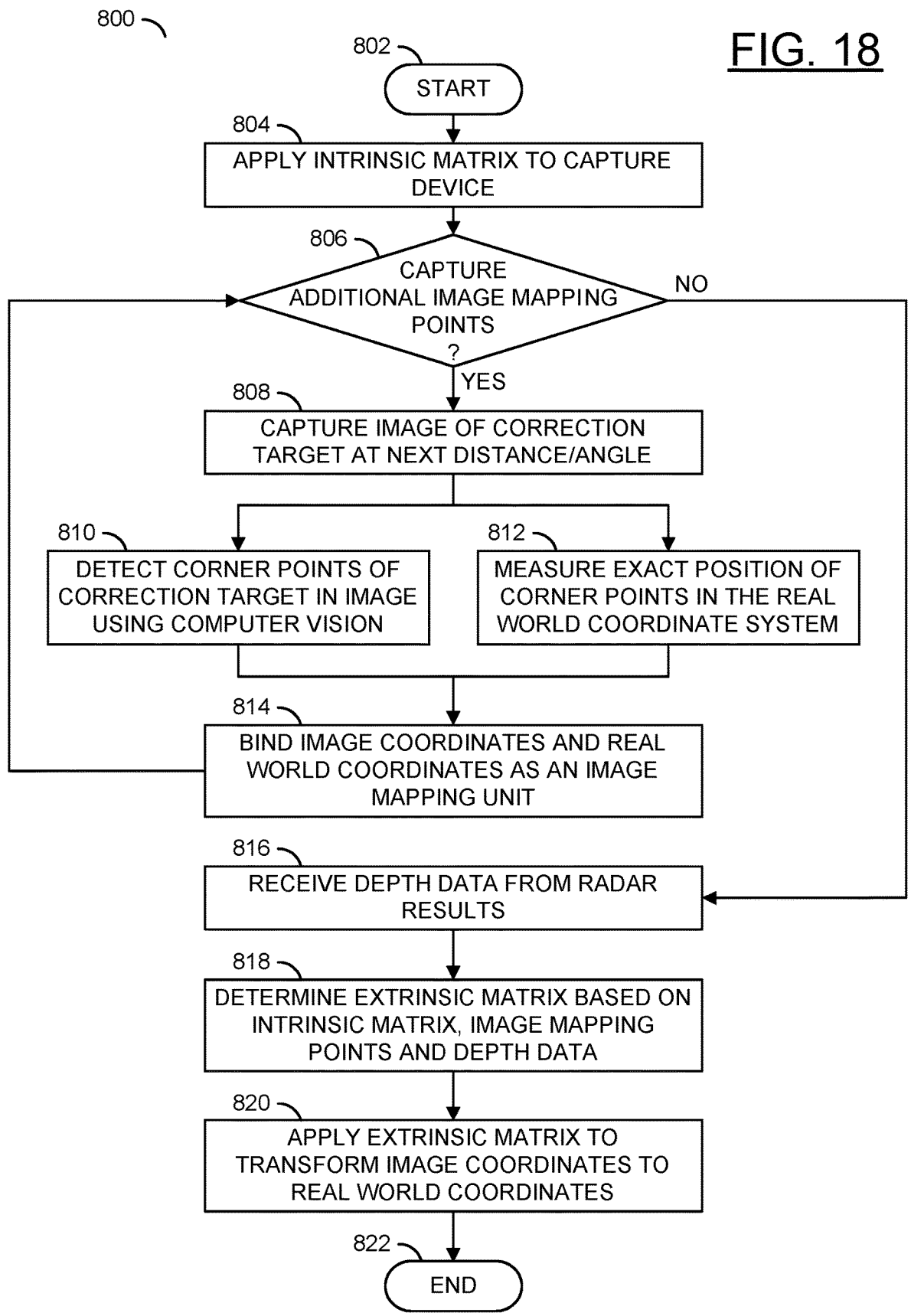
FIG. 18 is a flow diagram illustrating a method for determining an extrinsic matrix for a capture device.

Referring to FIG. 18, a method (or process) 800 is shown. The method 800 may determine an extrinsic matrix for a capture device. The method 800 generally comprises a step (or state) 802, a step (or state) 804, a decision step (or state) 806, a step (or state) 808, a step (or state) 810, a step (or state) 812, a step (or state) 814, a step (or state) 816, a step (or state) 818, a step (or state) 820, and a step (or state) 822.

The step 802 may start the method 800. In the step 804, the intrinsic matrix 192a may be applied to the capture device 104. Next, the method 800 may move to the decision step 806. In the decision step 806, the processor 102 may determine whether to capture additional image mapping points 192b. In one example, the processor 102 may compare the number of test images 340a-340n acquired to a number of images used to perform for the image correction technique 300 (e.g., based on a total number of image mapping points 192b desired). In another example, a person (e.g., an engineer, a technician, a product tester, etc.) may decide when a sufficient number of the images 340a-340n have been captured. If there are more images to capture, then the method 800 may move to the step 808.

In the step 808, the capture device 104 may capture one of the images 340a-340n of the correction target 320 at the next distance/angle. Next, the method 800 may move to the steps 810-812. The steps 810-812 may be performed in parallel and/or substantially in parallel. In some embodiments, the step 812 may be performed in advance. In the step 810, the processor 102 may perform computer vision operations to detect the corner points 346aa-346nn in the image (e.g., in the image coordinate system 342). Next, the method 800 may move to the step 814. In the step 812, a person may measure an exact position of the corresponding intersection point 330 in the environment coordinate system 324. Next, the method 800 may move to the step 814. In the step 814, the processor 102 may bind the image coordinates and the real world coordinates as one of the image mapping coordinates 192b. Next, the method 800 may return to the decision step 806.

In the decision step 806, if there are no more image mapping points 192b to capture, then the method 800 may move to the step 816. In the step 816, the processor 102 may receive the depth data results from the radar data results. Next, in the step 818, the processor 102 may determine the extrinsic matrix 192c based on the intrinsic matrix 192a, the image mapping points 192b and the depth data. For example, the processor 102 may solve the equation EQ1. In the step 820, the processor 102 may apply the extrinsic matrix 192c to transform data from the images in the image coordinate system 342 to the real world coordinate system 324. Next, the method 800 may move to the step 822. The step 822 may end the method 800.

Figure 19:
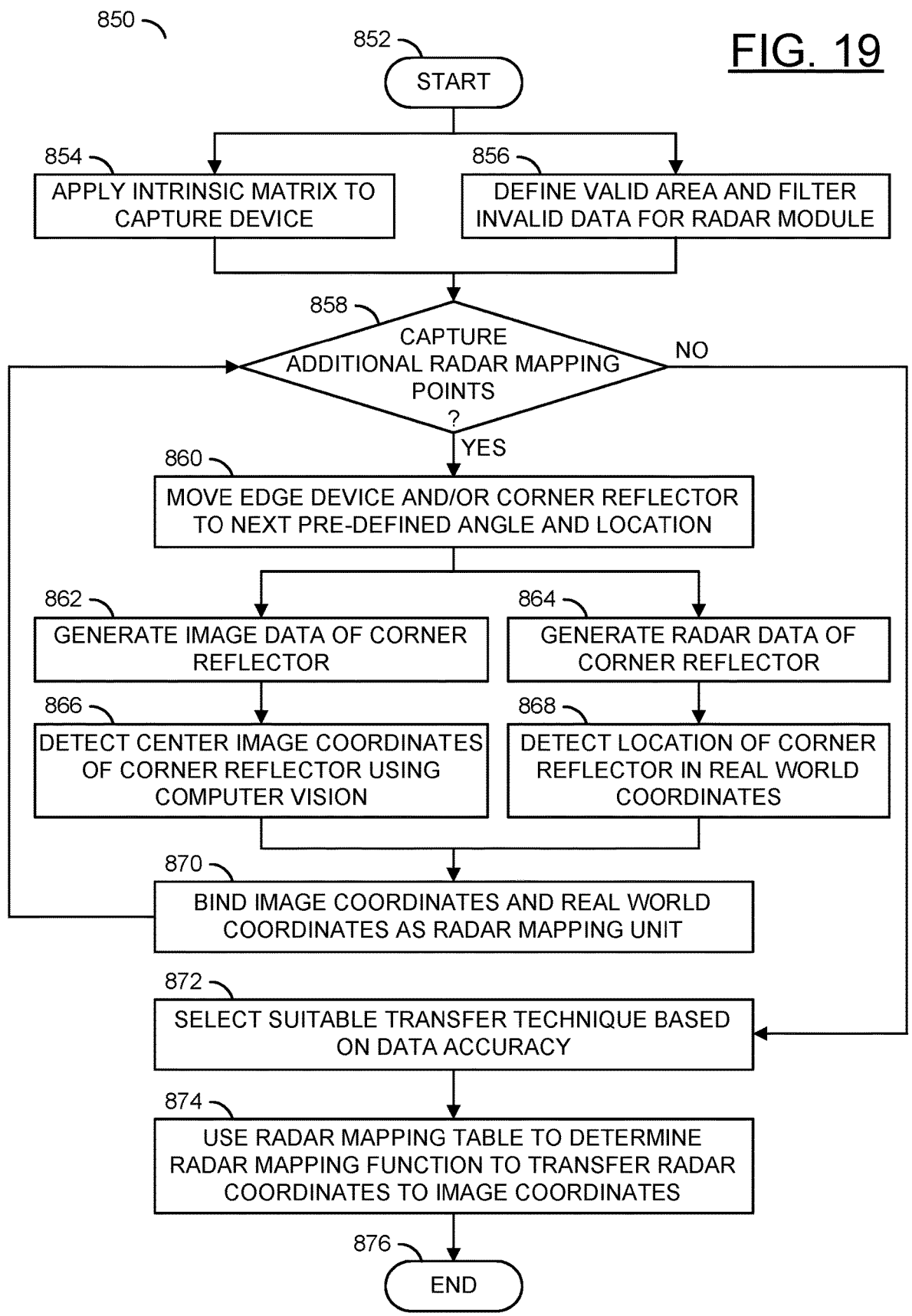
FIG. 19 is a flow diagram illustrating a method for determining a radar mapping function for a radar module.

Referring to FIG. 19, a method (or process) 850 is shown. The method 850 may determine a radar mapping function for a radar module. The method 850 generally comprises a step (or state) 852, a step (or state) 854, a step (or state) 856, a decision step (or state) 858, a step (or state) 860, a step (or state) 862, a step (or state) 864, a step (or state) 866, a step (or state) 868, a step (or state) 870, a step (or state) 872, a step (or state) 874, and a step (or state) 876.

The step 852 may start the method 850. Next, the method 850 may move to the steps 854-856. The steps 854-856 may be performed in parallel and/or substantially in parallel. In the step 854 the intrinsic matrix 192a may be applied to the images generated by the capture device 104. Next, the method 850 may move to the decision step 858. In the step 856, the processor 102 may define the valid area 194a and/or filter invalid data for the radar module 106. Next, the method 850 may move to the decision step 858.

In the decision step 858 the processor 102 may determine whether to capture additional radar mapping points 194b. In one example, the processor 102 may compare the number of reflector images 562a-562n acquired to a number of images used to perform the radar correction technique 550 (e.g., based on a total number of radar mapping points 194b desired). In another example, a person (e.g., an engineer, a technician, a product tester, etc.) may decide when a sufficient number of the reflector images 562a-562n have been captured. If there are more reflector images 562a-562n to capture, then the method 850 may move to the step 860.

In the step 860, the edge device 100i and/or the corner reflector 460 may be moved to the next pre-defined angle and location. For example, the corner reflector 460 may be moved to a next one of the locations LRa-LRn. Next, the method 850 may move to the steps 862-864. In the step 862, the capture device 104 may generate image data of the corner reflector 460. For example, the reflector images 562a-562n may capture 2D corner reflector representation 564 at the particular one of the reflector angles ARa-ARn and distances DRa-DRn. Next, the method 850 may move to the step 866. In the step 864, the radar module 106 may generate radar data of the corner reflector 460. Next, the method 850 may move to the step 868. In the step 866, the processor 102 and/or the CNN module 190b may perform the computer vision operations to detect the image coordinates of the pixel location 568 of the reflector center point 462. Next, the method 850 may move to the step 870. In the step 868, the processor 102 may detect the location of the corner reflector 460 in the real world coordinates based on the radar data. Next, the method 850 may move to the step 870. Generally, the steps 862-868 may be performed in parallel and/or substantially in parallel. In the step 870, the processor 102 may bind the image coordinates of the pixel location 568 from the computer vision result (e.g., U,V values) and the real world coordinates of the corner reflector 460 from the radar data (e.g., X,Y,Z values) as one of the radar mapping units 194b. Next, the method 850 may return to the decision step 858.

In the decision step 858, if there are not more of the radar mapping points 194b, then the method 850 may move to the step 872. In the step 872, the processor 102 may select a suitable transfer technique based on the data accuracy of the radar mapping points 194b. For example, the PnP technique 580 may be selected when the data accuracy of the radar mapping points 194b is high and/or vertical information is available. In another example, a polynomial regression technique may be selected when output accuracy is desired. In yet another example, the linear regression technique may be selected when the data accuracy of the radar mapping points 194b is relatively low and/or when vertical information is unavailable. Next, in the step 874, the processor 102 may use the radar mapping table (e.g., TABLE 2) to determine the radar mapping function 194c. The radar mapping function 194c may be used to transfer radar coordinates to the image coordinate system 342. Next, the method 850 may move to the step 876. The step 876 may end the method 850.

The functions performed by the diagrams of FIGS. 1-19 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive (i) pixel data and (ii) radar data; and
a processor configured to (i) process said pixel data arranged as video frames, (ii) calculate an intrinsic matrix for an image sensor using a calibration method, (iii) generate a plurality of image mapping points to an environment for said image sensor using an image correction method, (iv) generate an image transformation matrix in response to said image mapping points, said intrinsic matrix and depth data, (v) define a valid area in response to said radar data of an object, (vi) generate a plurality of radar mapping points in response to an environment for a radar device using a radar correction method, (vii) generate a mapping function in response to said plurality of radar mapping points and a transfer operation, and (viii) implement a coordinate transformation in response to said image transformation matrix and said mapping function, wherein
(a) said intrinsic matrix comprises distortion coefficients for a single camera lens,
(b) said radar mapping points bind radar coordinates to image coordinates,
(c) said depth data is generated in response to said radar coordinates, and
(d) said coordinate transformation is configured to (i) transfer radar coordinates to image coordinates in response to said mapping function and (ii) transfer said image coordinates to environment coordinates using said image transformation matrix.

2. The apparatus according to claim 1, wherein said calibration method comprises capturing a set of images of a first test pattern from multiple angles.

3. The apparatus according to claim 1, wherein said calibration method is configured to correct a lens distortion effect.

4. The apparatus according to claim 1, wherein said calibration method comprises at least one of a Zhang Zhengyou calibration and a Jean-Yves Bouguet calibration.

5. The apparatus according to claim 1, wherein said image correction method comprises capturing a set of images of a second test pattern from multiple distances.

6. The apparatus according to claim 5, wherein said second test pattern comprises a checkerboard pattern with a selected intersection point.

7. The apparatus according to claim 6, wherein said image correction method is configured to correlate two dimensional coordinates of an image to three dimensional coordinates of said environment.

8. The apparatus according to claim 6, wherein said image correction method is configured to detect said selected intersection point from one of said images and measure a three dimensional coordinate in said environment to bind one of said image mapping points.

9. The apparatus according to claim 1, wherein said image transformation matrix comprises a rotation matrix and a translation vector.

10. The apparatus according to claim 9, wherein said rotation matrix and said translation vector are determined in response to a Perspective-n-Point (PnP) method.

11. The apparatus according to claim 1, wherein said valid area is defined in response to filtering said radar coordinates and converting said radar coordinates of said object to three dimensional coordinates of said environment.

12. The apparatus according to claim 1, wherein said object comprises a corner reflector.

13. The apparatus according to claim 1, wherein said radar correction method comprises capturing a set of corrected images of said object at different locations and corresponding sets of said radar data of said object at said different locations.

14. The apparatus according to claim 1, wherein said radar correction method comprises determining a center point of said object in two dimensional image coordinates and said radar coordinates of said object to bind one of said radar mapping points.

15. The apparatus according to claim 1, wherein said radar device performs said radar correction method in response to directly generating three dimensional coordinates in said environment of said object for mapping said radar coordinates to said image coordinates.

16. The apparatus according to claim 1, wherein said transfer operation comprises a Perspective-n-Point (PnP) operation.

17. The apparatus according to claim 1, wherein said transfer operation comprises at least one of a polynomial regression and a linear regression operation.

18. The apparatus according to claim 1, wherein said coordinate transformation is configured to enable a fusion of a vision field of view with a radar field of view.

19. The apparatus according to claim 1, wherein said radar device comprises a non-automotive mmWave Radar.

20. The apparatus according to claim 1, wherein at least one of said mapping function, said image transformation matrix and said environment coordinates are sent to an external device.

* * * * *